(12) United States Patent
Nishino et al.

(10) Patent No.: US 12,191,783 B2
(45) Date of Patent: Jan. 7, 2025

(54) OPERATING DEVICE

(71) Applicant: SHIMANO INC., Sakai (JP)

(72) Inventors: Takafumi Nishino, Sakai (JP); Shingo Sakurai, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 15/954,537

(22) Filed: Apr. 16, 2018

(65) Prior Publication Data

US 2019/0315424 A1    Oct. 17, 2019

(51) Int. Cl.
| | |
|---|---|
| *B62J 99/00* | (2020.01) |
| *B62J 43/30* | (2020.01) |
| *B62K 23/06* | (2006.01) |
| *B62L 3/02* | (2006.01) |
| *F15B 1/26* | (2006.01) |
| *F15B 11/08* | (2006.01) |
| *F15B 15/14* | (2006.01) |
| *H02J 7/32* | (2006.01) |
| *H02N 2/18* | (2006.01) |
| *B62J 45/00* | (2020.01) |
| *H02J 7/34* | (2006.01) |

(52) U.S. Cl.
CPC ................ *H02N 2/18* (2013.01); *B62J 43/30* (2020.02); *B62K 23/06* (2013.01); *B62L 3/023* (2013.01); *F15B 1/26* (2013.01); *F15B 11/08* (2013.01); *F15B 15/14* (2013.01); *H02J 7/32* (2013.01); *H02J 7/345* (2013.01)

(58) Field of Classification Search
CPC . B62J 43/30; B62J 99/00; B62L 3/023; B62L 3/02; B62K 23/06; F15B 11/08; F15B 15/14; F15B 1/26; H02N 2/18; H02K 53/00; H02J 7/345

USPC .......... 307/9.1, 10.1, 10.2, 10.7, 66, 64, 43; 320/108, 109; 180/206.1
See application file for complete search history.

(56) References Cited

U.S. PATENT DOCUMENTS

| | | | |
|---|---|---|---|
| 10,355,623 B1 * | 7/2019 | Yavid | H10N 30/30 |
| 2010/0001646 A1 * | 1/2010 | Yu | B62J 6/06 |
| | | | 310/339 |
| 2010/0042074 A1 * | 2/2010 | Weston | A61M 1/81 |
| | | | 604/543 |
| 2010/0052284 A1 * | 3/2010 | James | B62M 1/36 |
| | | | 280/231 |

(Continued)

FOREIGN PATENT DOCUMENTS

| | | |
|---|---|---|
| CN | 105644704 | 6/2016 |
| CN | 105966527 | 9/2016 |

(Continued)

*Primary Examiner* — Rexford N Barnie
*Assistant Examiner* — Swarna N Chowdhuri
(74) *Attorney, Agent, or Firm* — MORI & WARD, LLP

(57) ABSTRACT

An operating device for a human powered vehicle comprises a base member, a first operating member, a piston, and an electric generator. The base member includes a cylinder bore. The first operating member is configured to be movably coupled to the base member between a first rest position and a first operated position. The piston is configured to be movably provided in the cylinder bore and to be pulled in response to a movement of the first operating member from the first rest position toward the first operated position. The electric generator is configured to generate electric power in accordance with a physical change applied to the operating device.

32 Claims, 23 Drawing Sheets

(56) References Cited

U.S. PATENT DOCUMENTS

| | | | | |
|---|---|---|---|---|
| 2011/0266082 | A1* | 11/2011 | Yang | B62M 1/36 180/206.5 |
| 2013/0014607 | A1* | 1/2013 | Miki | B62K 23/06 74/501.6 |
| 2013/0257145 | A1* | 10/2013 | Caldeira | B60L 50/62 307/9.1 |
| 2014/0090498 | A1* | 4/2014 | Kojima | F16H 63/14 74/331 |
| 2014/0175770 | A1* | 6/2014 | James | B62M 1/36 280/231 |
| 2014/0262578 | A1* | 9/2014 | Galley | B62K 5/027 180/210 |
| 2015/0321725 | A1* | 11/2015 | Kariyama | B62L 3/023 74/491 |
| 2016/0052587 | A1* | 2/2016 | Fukao | B62M 25/04 74/491 |
| 2016/0152302 | A1* | 6/2016 | Nishino | B62M 25/08 701/2 |
| 2016/0164282 | A1* | 6/2016 | Bellala | H02J 7/35 307/52 |
| 2016/0264213 | A1* | 9/2016 | Swanson | B62K 23/06 |
| 2016/0280327 | A1* | 9/2016 | Tiso | H02J 7/34 |
| 2016/0311499 | A1* | 10/2016 | Kasai | B62K 23/06 |
| 2016/0327070 | A1* | 11/2016 | Fujiwara | B62M 25/04 |
| 2016/0362021 | A1* | 12/2016 | Sveje | B60L 50/51 |
| 2018/0057103 | A1* | 3/2018 | Komatsu | F15B 7/08 |
| 2018/0076840 | A1 | 3/2018 | Masuda et al. | |
| 2018/0178870 | A1* | 6/2018 | Takeshita | G09G 5/006 |
| 2019/0039679 | A1* | 2/2019 | Nakai | B62K 23/06 |
| 2019/0118901 | A1* | 4/2019 | Nago | B60T 1/10 |
| 2019/0300092 | A1* | 10/2019 | Masuda | B62M 25/08 |
| 2019/0315435 | A1* | 10/2019 | Jordan | B62L 3/02 |

FOREIGN PATENT DOCUMENTS

| | | |
|---|---|---|
| CN | 107434003 | 12/2017 |
| DE | 10 2017 007 566 | 3/2018 |
| WO | WO 2015/068125 | 5/2015 |

\* cited by examiner

| EMBODIMENTS MODIFICATIONS | 54,76 | | | 70 | | | 80 | | |
|---|---|---|---|---|---|---|---|---|---|
| | 54X 76X | 54Y 76Y | 54Z 76Z | 76X | 76Y | 76Z | 80X | 80Y | 80Z |
| 1ST | O | - | - | O | - | - | O | - | - |
| M1-1 | O | - | - | O | - | - | - | O | - |
| 4TH | O | - | - | O | - | - | - | - | O |
| M1-2 | O | - | - | O | - | - | O | O | - |
| M1-3 | O | - | - | O | - | - | O | - | O |
| M1-4 | O | - | - | O | - | - | - | O | O |
| M1-5 | O | - | - | O | - | - | O | O | O |
| M1-6 | - | O | - | O | - | - | O | - | - |
| M1-7 | - | O | - | O | - | - | - | O | - |
| M1-8 | - | O | - | O | - | - | - | - | O |
| M1-9 | - | O | - | O | - | - | O | O | - |
| M1-10 | - | O | - | O | - | - | O | - | O |
| M1-11 | - | O | - | O | - | - | - | O | O |
| M1-12 | - | O | - | O | - | - | O | O | O |
| M1-13 | - | - | O | O | - | - | O | - | - |
| M1-14 | - | - | O | O | - | - | - | O | - |
| M1-15 | - | - | O | O | - | - | - | - | O |
| M1-16 | - | - | O | O | - | - | O | O | - |
| M1-17 | - | - | O | O | - | - | O | - | O |
| M1-18 | - | - | O | O | - | - | - | O | O |
| M1-19 | - | - | O | O | - | - | O | O | O |
| M1-20 | O | O | - | O | - | - | O | - | - |
| M1-21 | O | O | - | O | - | - | - | O | - |
| M1-22 | O | O | - | O | - | - | - | - | O |
| M1-23 | O | O | - | O | - | - | O | O | - |
| M1-24 | O | O | - | O | - | - | O | - | O |
| M1-25 | O | O | - | O | - | - | - | O | O |
| M1-26 | O | O | - | O | - | - | O | O | O |

*FIG. 18*

| EMBODIMENTS MODIFICATIONS | 54,76 | | | 70 | | | 80 | | |
|---|---|---|---|---|---|---|---|---|---|
| | 54X 76X | 54Y 76Y | 54Z 76Z | 76X | 76Y | 76Z | 80X | 80Y | 80Z |
| M1-27 | O | - | O | O | - | - | O | - | - |
| M1-28 | O | - | O | O | - | - | - | O | - |
| M1-29 | O | - | O | O | - | - | - | - | O |
| M1-30 | O | - | O | O | - | - | O | O | - |
| M1-31 | O | - | O | O | - | - | O | - | O |
| M1-32 | O | - | O | O | - | - | - | O | O |
| M1-33 | O | - | O | O | - | - | O | O | O |
| M1-34 | - | O | O | O | - | - | O | - | - |
| M1-35 | - | O | O | O | - | - | - | O | - |
| M1-36 | - | O | O | O | - | - | - | - | O |
| M1-37 | - | O | O | O | - | - | O | O | - |
| M1-38 | - | O | O | O | - | - | O | - | O |
| M1-39 | - | O | O | O | - | - | - | O | O |
| M1-40 | - | O | O | O | - | - | O | O | O |
| M1-41 | O | O | O | O | - | - | O | - | - |
| M1-42 | O | O | O | O | - | - | - | O | - |
| M1-43 | O | O | O | O | - | - | - | - | O |
| M1-44 | O | O | O | O | - | - | O | O | - |
| M1-45 | O | O | O | O | - | - | O | - | O |
| M1-46 | O | O | O | O | - | - | - | O | O |
| M1-47 | O | O | O | O | - | - | O | O | O |

*FIG. 19*

| EMBODIMENTS MODIFICATIONS | 54,76 | | | 70 | | | 80 | | |
|---|---|---|---|---|---|---|---|---|---|
| | 54X 76X | 54Y 76Y | 54Z 76Z | 76X | 76Y | 76Z | 80X | 80Y | 80Z |
| M2-1 | O | - | - | - | O | - | O | - | - |
| M2-2 | O | - | - | - | O | - | - | O | - |
| M2-3 | O | - | - | - | O | - | - | - | O |
| M2-4 | O | - | - | - | O | - | O | O | - |
| M2-5 | O | - | - | - | O | - | O | - | O |
| M2-6 | O | - | - | - | O | - | - | O | O |
| M2-7 | O | - | - | - | O | - | O | O | O |
| M2-8 | - | O | - | - | O | - | O | - | - |
| 2ND | - | O | - | - | O | - | - | O | - |
| M2-9 | - | O | - | - | O | - | - | - | O |
| M2-10 | - | O | - | - | O | - | O | O | - |
| M2-11 | - | O | - | - | O | - | O | - | O |
| M2-12 | - | O | - | - | O | - | - | O | O |
| M2-13 | - | O | - | - | O | - | O | O | O |
| M2-14 | - | - | O | - | O | - | O | - | - |
| M2-15 | - | - | O | - | O | - | - | O | - |
| M2-16 | - | - | O | - | O | - | - | - | O |
| M2-17 | - | - | O | - | O | - | O | O | - |
| M2-18 | - | - | O | - | O | - | O | - | O |
| M2-19 | - | - | O | - | O | - | - | O | O |
| M2-20 | - | - | O | - | O | - | O | O | O |
| M2-21 | O | O | - | - | O | - | O | - | - |
| M2-22 | O | O | - | - | O | - | - | O | - |
| M2-23 | O | O | - | - | O | - | - | - | O |
| M2-24 | O | O | - | - | O | - | O | O | - |
| M2-25 | O | O | - | - | O | - | O | - | O |
| M2-26 | O | O | - | - | O | - | - | O | O |
| M2-27 | O | O | - | - | O | - | O | O | O |

FIG. 20

| EMBODIMENTS MODIFICATIONS | 54,76 | | | 70 | | | 80 | | |
|---|---|---|---|---|---|---|---|---|---|
| | 54X/76X | 54Y/76Y | 54Z/76Z | 76X | 76Y | 76Z | 80X | 80Y | 80Z |
| M2-28 | O | - | O | - | O | - | O | - | - |
| M2-29 | O | - | O | - | O | - | - | O | - |
| M2-30 | O | - | O | - | O | - | - | - | O |
| M2-31 | O | - | O | - | O | - | O | O | - |
| M2-32 | O | - | O | - | O | - | O | - | O |
| M2-33 | O | - | O | - | O | - | - | O | O |
| M2-34 | O | - | O | - | O | - | O | O | O |
| M2-35 | - | O | O | - | O | - | O | - | - |
| M2-36 | - | O | O | - | O | - | - | O | - |
| M2-37 | - | O | O | - | O | - | - | - | O |
| M2-38 | - | O | O | - | O | - | O | O | - |
| M2-39 | - | O | O | - | O | - | O | - | O |
| M2-40 | - | O | O | - | O | - | - | O | O |
| M2-41 | - | O | O | - | O | - | O | O | O |
| M2-42 | O | O | O | - | O | - | O | - | - |
| M2-43 | O | O | O | - | O | - | - | O | - |
| M2-44 | O | O | O | - | O | - | - | - | O |
| M2-45 | O | O | O | - | O | - | O | O | - |
| M2-46 | O | O | O | - | O | - | O | - | O |
| M2-47 | O | O | O | - | O | - | - | O | O |
| M2-48 | O | O | O | - | O | - | O | O | O |

*FIG. 21*

| EMBODIMENTS MODIFICATIONS | 54,76 | | | 70 | | | 80 | | |
|---|---|---|---|---|---|---|---|---|---|
| | 54X 76X | 54Y 76Y | 54Z 76Z | 76X | 76Y | 76Z | 80X | 80Y | 80Z |
| M3-1 | O | - | - | - | - | O | O | - | - |
| M3-2 | O | - | - | - | - | O | - | O | - |
| M3-3 | O | - | - | - | - | O | - | - | O |
| M3-4 | O | - | - | - | - | O | O | O | - |
| M3-5 | O | - | - | - | - | O | O | - | O |
| M3-6 | O | - | - | - | - | O | - | O | O |
| M3-7 | O | - | - | - | - | O | O | O | O |
| M3-8 | - | O | - | - | - | O | O | - | - |
| M3-9 | - | O | - | - | - | O | - | O | - |
| M3-10 | - | O | - | - | - | O | - | - | O |
| M3-11 | - | O | - | - | - | O | O | O | - |
| M3-12 | - | O | - | - | - | O | O | - | O |
| M3-13 | - | O | - | - | - | O | - | O | O |
| M3-14 | - | O | - | - | - | O | O | O | O |
| M3-15 | - | - | O | - | - | O | O | - | - |
| M3-16 | - | - | O | - | - | O | - | O | - |
| 3RD | - | - | O | - | - | O | - | - | O |
| M3-17 | - | - | O | - | - | O | O | O | - |
| M3-18 | - | - | O | - | - | O | O | - | O |
| M3-19 | - | - | O | - | - | O | - | O | O |
| M3-20 | - | - | O | - | - | O | O | O | O |
| M3-21 | O | O | - | - | - | O | O | - | - |
| M3-22 | O | O | - | - | - | O | - | O | - |
| M3-23 | O | O | - | - | - | O | - | - | O |
| M3-24 | O | O | - | - | - | O | O | O | - |
| M3-25 | O | O | - | - | - | O | O | - | O |
| M3-26 | O | O | - | - | - | O | - | O | O |
| M3-27 | O | O | - | - | - | O | O | O | O |

*FIG. 22*

| EMBODIMENTS MODIFICATIONS | 54,76 | | | 70 | | | 80 | | |
|---|---|---|---|---|---|---|---|---|---|
| | 54X 76X | 54Y 76Y | 54Z 76Z | 76X | 76Y | 76Z | 80X | 80Y | 80Z |
| M3-28 | O | - | O | - | - | O | O | - | - |
| M3-29 | O | - | O | - | - | O | - | O | - |
| M3-30 | O | - | O | - | - | O | - | - | O |
| M3-31 | O | - | O | - | - | O | O | O | - |
| M3-32 | O | - | O | - | - | O | O | - | O |
| M3-33 | O | - | O | - | - | O | - | O | O |
| M3-34 | O | - | O | - | - | O | O | O | O |
| M3-35 | - | O | O | - | - | O | O | - | - |
| M3-36 | - | O | O | - | - | O | - | O | - |
| M3-37 | - | O | O | - | - | O | - | - | O |
| M3-38 | - | O | O | - | - | O | O | O | - |
| M3-39 | - | O | O | - | - | O | O | - | O |
| M3-40 | - | O | O | - | - | O | - | O | O |
| M3-41 | - | O | O | - | - | O | O | O | O |
| M3-42 | O | O | O | - | - | O | O | - | - |
| M3-43 | O | O | O | - | - | O | - | O | - |
| M3-44 | O | O | O | - | - | O | - | - | O |
| M3-45 | O | O | O | - | - | O | O | O | - |
| M3-46 | O | O | O | - | - | O | O | - | O |
| M3-47 | O | O | O | - | - | O | - | O | O |
| M3-48 | O | O | O | - | - | O | O | O | O |

FIG. 23

One
OPERATING DEVICE

BACKGROUND OF THE INVENTION

Field of the Invention

The present invention relates to an operating device.

Discussion of the Background

For example, U.S. Patent Application Publication No. 2016/0264213 discloses a bicycle control device.

SUMMARY OF THE INVENTION

In accordance with a first aspect of the present invention, an operating device for a human powered vehicle comprises a base member, a first operating member, a piston, and an electric generator. The base member includes a cylinder bore. The first operating member is configured to be movably coupled to the base member between a first rest position and a first operated position. The piston is configured to be movably provided in the cylinder bore and to be pulled in response to a movement of the first operating member from the first rest position toward the first operated position. The electric generator is configured to generate electric power in accordance with a physical change applied to the operating device.

With the operating device according to the first aspect, it is possible to generate electric power in the operating device including the pull-type piston. This improves energy saving in the operating device.

In accordance with a second aspect of the present invention, the operating device according to the first aspect further comprises a power storage configured to be charged with the electric power generated by the electric generator.

With the operating device according to the second aspect, it is possible to efficiently use the electric power since the power storage is configured to be charged with the electric power generated by the electric generator.

In accordance with a third aspect of the present invention, the operating device according to the second aspect further comprises a second operating member configured to be movably coupled to one of the base member and the first operating member. The power storage is configured to be provided on at least one of the base member, the first operating member, and the second operating member.

With the operating device according to the third aspect, it is possible to improve freedom degree of arrangement of the power storage.

In accordance with a fourth aspect of the present invention, the operating device according to any one of the first to third aspects further comprises an electrical switch and a controller configured to generate an operation signal in response to an operation of the electrical switch. The electric generator is configured to generate the electric power in response to the operation of the electrical switch.

With the operating device according to the fourth aspect, it is possible to generate electric power by using the operation of the electrical switch. This improves energy saving.

In accordance with a fifth aspect of the present invention, the operating device according to the fourth aspect further comprises a second operating member configured to be movably coupled to one of the base member and the first operating member. Both of the electrical switch and the electric generator are provided on at least one of the base member, the first operating member, and the second operating member.

With the operating device according to the fifth aspect, it is possible to improve freedom degree of arrangement of the electrical switch and the electric generator.

In accordance with a sixth aspect of the present invention, the operating device according to the fourth or fifth aspect further comprises a communicator configured to wirelessly transmit the operation signal generated by the controller.

With the operating device according to the sixth aspect, the communicator allows an electric cable to be omitted.

In accordance with a seventh aspect of the present invention, the operating device according to the sixth aspect further comprises a second operating member configured to be movably coupled to one of the base member and the first operating member. The communicator is configured to be provided on at least one of the base member, the first operating member, and the second operating member.

With the operating device according to the seventh aspect, it is possible to improve freedom degree of arrangement of the communicator.

In accordance with an eighth aspect of the present invention, the operating device according to any one of the first to seventh aspects is configured so that the electric generator includes a piezoelectric element.

With the operating device according to the eighth aspect, it is possible to generate electric power with piezoelectric effect.

In accordance with a ninth aspect of the present invention, the operating device according to any one of the first to eighth aspects is configured so that the base member includes a hydraulic reservoir configured to be connected to the cylinder bore.

With the operating device according to the ninth aspect, the hydraulic reservoir absorbs change in volume of a hydraulic fluid.

In accordance with a tenth aspect of the present invention, the operating device according to any one of the first to ninth aspects is configured so that the base member includes a first end configured to be mounted to a steering device of the human powered vehicle, a second end opposite to the first end, and a grip portion configured to be arranged between the first end and the second end.

With the operating device according to the tenth aspect, it is possible to improve energy saving in a road-type operating device.

In accordance with an eleventh aspect of the present invention, an operating device for a human powered vehicle comprises a base member, a first operating, a piston, and a power storage. The base member includes a cylinder bore. The first operating member is configured to be movably coupled to the base member between a first rest position and a first operated position. The piston is configured to be movably provided in the cylinder bore and to be pulled in response to a movement of the first operating member from the first rest position toward the first operated position. The power storage is configured to be charged.

With the operating device according to the eleventh aspect, it is possible to efficiently use the electric power since the power storage is configured to be charged.

In accordance with a twelfth aspect of the present invention, the operating device according to the eleventh aspect further comprises a second operating member configured to be movably coupled to one of the base member and the first operating member. The power storage is configured to be provided on at least one of the base member, the first operating member, and the second operating member.

With the operating device according to the twelfth aspect, it is possible to improve freedom degree of arrangement of the power storage.

In accordance with a thirteenth aspect of the present invention, the operating device according to the eleventh or twelfth aspect further comprises an electric generator configured to generate electric power in accordance with a physical change applied to the operating device. The power storage is configured to be charged with the electric power generated by the electric generator.

With the operating device according to the thirteenth aspect, it is possible to efficiently use the electric power since the power storage is configured to be charged with the electric power generated by the electric generator.

In accordance with a fourteenth aspect of the present invention, the operating device according to the thirteenth aspect further comprises an electrical switch and a controller configured to generate an operation signal in response to an operation of the electrical switch. The electric generator is configured to generate the electric power in response to the operation of the electrical switch.

With the operating device according to the fourteenth aspect, it is possible to generate electric power by using the operation of the electrical switch. This improves energy saving.

In accordance with a fifteenth aspect of the present invention, the operating device according to the fourteenth aspect further comprises a second operating member configured to be movably coupled to one of the base member and the first operating member. Both of the electrical switch and the electric generator are provided on at least one of the base member, the first operating member, and the second operating member.

With the operating device according to the fifteenth aspect, it is possible to improve freedom degree of arrangement of the electrical switch and the electric generator.

In accordance with a sixteenth aspect of the present invention, the operating device according to the fourteenth or fifteenth aspect further comprises a communicator configured to wirelessly transmit the operation signal generated by the controller.

With the operating device according to the sixteenth aspect, the communicator allows an electric cable to be omitted.

In accordance with a seventeenth aspect of the present invention, the operating device according to the sixteenth aspect further comprises a second operating member configured to be movably coupled to one of the base member and the first operating member. The communicator is configured to be provided on at least one of the base member, the first operating member, and the second operating member.

With the operating device according to the seventeenth aspect, it is possible to improve freedom degree of arrangement of the communicator.

In accordance with an eighteenth aspect of the present invention, the operating device according to the thirteenth or fourteenth aspect is configured so that the electric generator includes a piezoelectric element.

With the operating device according to the eighteenth aspect, it is possible to generate electric power with piezoelectric effect.

In accordance with a nineteenth aspect of the present invention, the operating device according to any one of the eleventh to eighteenth aspects is configured so that the base member includes a hydraulic reservoir configured to be connected to the cylinder bore.

With the operating device according to the nineteenth aspect, the hydraulic reservoir absorbs change in volume of a hydraulic fluid.

In accordance with a twentieth aspect of the present invention, the operating device according to any one of the eleventh to nineteenth aspects is configured so that the base member includes a first end configured to be mounted to a steering device of the human powered vehicle, a second end opposite to the first end, and a grip portion configured to be arranged between the first end and the second end.

With the operating device according to the twentieth aspect, it is possible to improve energy saving in a road-type operating device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 18 to 23 show combinations of the arrangements illustrated in FIG. 17.

DESCRIPTION OF THE EMBODIMENTS

Figure 1:
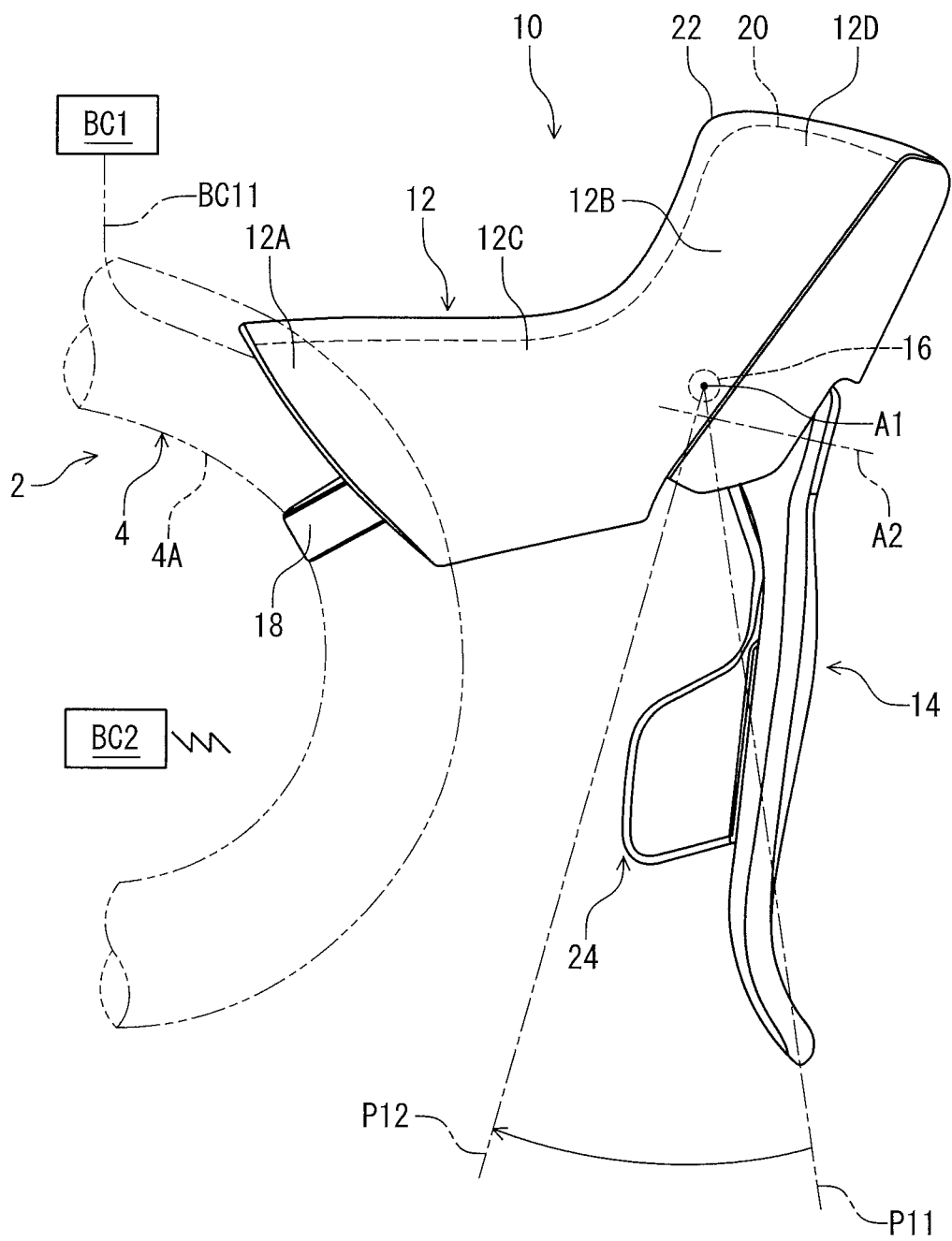
FIG. 1 is a right side elevational view of an operating device in accordance with a first embodiment.

The embodiment(s) will now be described with reference to the accompanying drawings, wherein like reference numerals designate corresponding or identical elements throughout the various drawings.

First Embodiment

Referring initially to FIG. 1, an operating device 10 for a human powered vehicle 2 in accordance with a first embodiment is illustrated. The operating device 10 is configured to be mounted to a steering device 4 of the human powered vehicle 2. The human powered vehicle 2 is a vehicle to travel with a motive power including at least a human power of a rider who rides the human powered vehicle 2. The human powered vehicle 2 has an arbitrary number of wheels. For example, the human powered vehicle 2 has one, two, three, four, or five or more wheels. In this embodiment, the human powered vehicle 2 has a smaller size than that of a four-wheeled automobile, but the human powered vehicle 2 can have an arbitrary size. For example, the human powered vehicle 2 can be larger than the four-wheeled automobile. Examples of the human powered vehicle 2 include a bicycle, a tricycle, and a kick scooter.

The operating device 10 is configured to be operatively coupled to a hydraulic component BC1. In this embodiment, the operating device 10 is operatively coupled to the hydraulic component BC1 via a hydraulic hose BC11. Examples of the hydraulic component BC1 include a brake device.

Furthermore, the operating device 10 is operatively connected to an electrical component BC2 with wireless communication. However, operating device 10 can be configured to be operatively connected to an electrical component BC2 with an electric cable. Examples of the electrical component BC2 include an electric shifting device, an electric suspension, and an electric seatpost. In this embodiment, the operating device 10 is operatively connected to an electric shifting device as the electrical component BC2 via wireless communication. Examples of the electric shifting device include a derailleur and an internal-gear hub.

In this embodiment, the operating device 10 is a right-hand side control device configured to be operated by the rider's right hand to actuate the hydraulic component BC1 and the electrical component BC2. However, the structures of the operating device 10 can be applied to a left-hand side control device.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of the human powered vehicle 2 (e.g., a bicycle) with facing the steering device 4. Accordingly, these terms, as utilized to describe the operating device 10, should be interpreted relative to the human powered vehicle 2 (e.g., the bicycle) equipped with the operating device 10 as used in an upright riding position on a horizontal surface.

The operating device 10 for the human powered vehicle 2 comprises a base member 12 and a first operating member 14. The first operating member 14 is configured to be movably coupled to the base member 12 between a first rest position P11 and a first operated position P12. The first operating member 14 is movably coupled to the base member 12 between the first rest position P11 and the first operated position P12 in a first direction D1. The first operating member 14 is pivotally coupled to the base member 12 about a first pivot axis A1 in the first direction D1. The first operating member 14 is pivotable relative to the base member 12 about the first pivot axis A1 between the first rest position P11 and the first operated position P12. In this embodiment, the first operating member 14 is provided as a brake operating lever pivotable about the first pivot axis A1. The first direction D1 is a circumferential direction defined about the first pivot axis A1.

In the present application, the term "rest position" as used herein refers to a position at which a movable part such as the first operating member 14 remains stationary in a state where the movable part is not operated by the user. The term "operated position" as used herein refers to a position at which the movable part has been operated by the user to perform the operation of the component of the human powered vehicle.

As seen in FIG. 1, the first operating member 14 is pivotally coupled to the base member 12 via a first pivot pin 16. The first pivot pin 16 defines the first pivot axis A1. The first operating member 14 is biased by a first biasing member (not shown) toward the first rest position P11 relative to the base member 12. Thus, the first operating member 14 is in the first rest position P11 in a state where the user does not operate the first operating member 14.

The base member 12 includes a first end 12A, a second end 12B, and a grip portion 12C. The first end 12A is configured to be mounted to the steering device 4 of the human powered vehicle 2. The second end 12B is opposite to the first end 12A. The grip portion 12C is configured to be arranged between the first end 12A and the second end 12B.

The second end 12B includes a pommel portion 12D. The pommel portion 12D extends obliquely upward from the grip portion 12C. The pommel portion 12D is disposed at a position higher than a position of the first end 12A in the mounting state of the operating device 10. The pommel portion 12D can also be configured to be graspable if needed and/or desired.

In this embodiment, the first end 12A is configured to be coupled to the steering device 4 in a mounting state where the operating device 10 is mounted to the steering device 4. The first end 12A is configured to be coupled to a curved part 4A of the steering device 4 in the mounting state where the operating device 10 is mounted to the steering device 4. Examples of the steering device 4 include a handlebar. Examples of the handlebar include a drop-down handlebar, a flat handlebar, a time trial handlebar, and a bull horn handlebar. In this embodiment, the operating device 10 is configured to be mounted to a drop-down handlebar. However, structures of the operating device 10 can be applied to other operating devices mounted to other type of steering devices.

Figure 2:
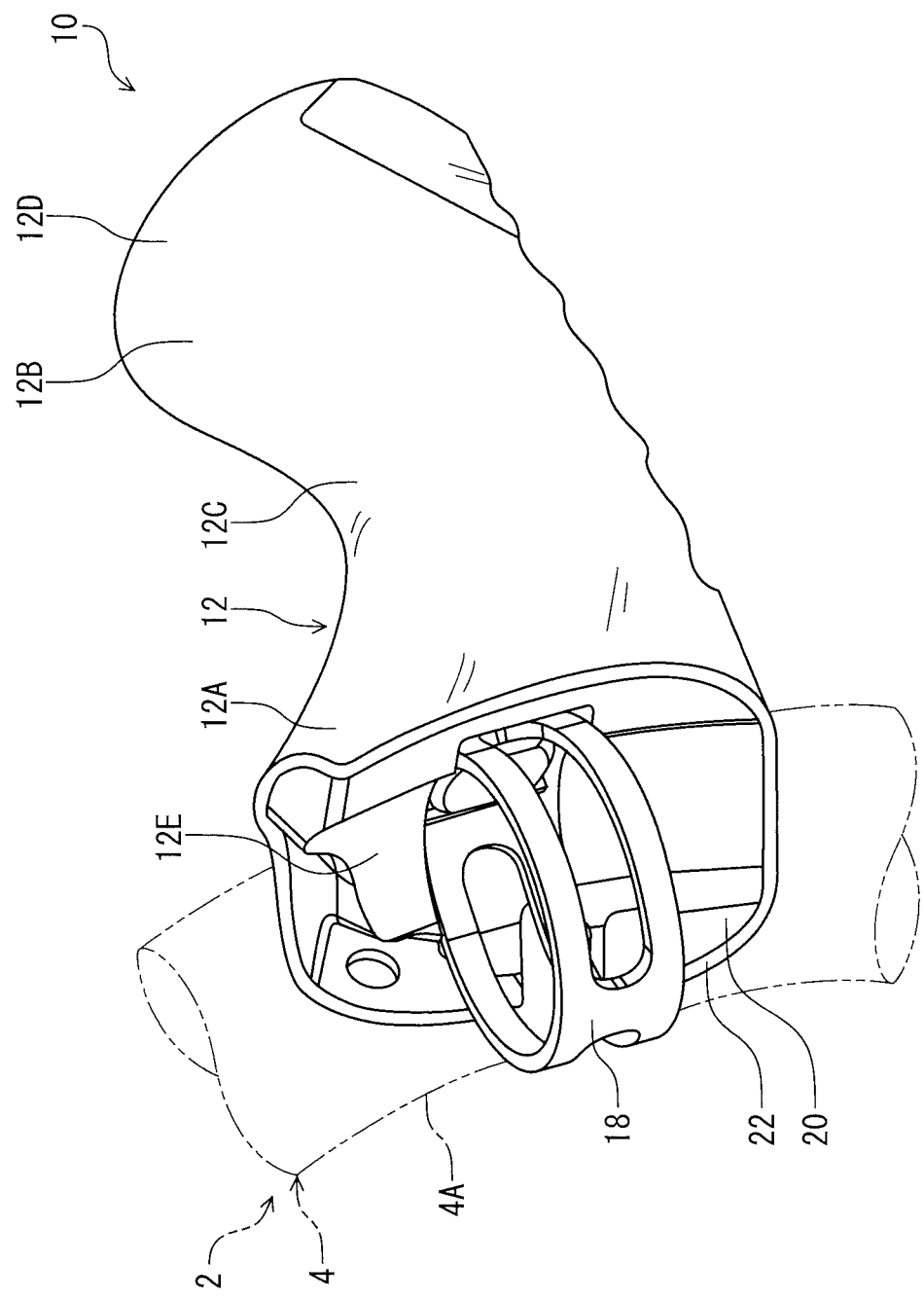
FIG. 2 is a partial perspective view of the operating device illustrated in FIG. 1.

As seen in FIG. 2. the operating device 10 comprises a mounting clamp 18 to couple the base member 12 to the steering device 4. The first end 12A includes a mounting surface 12E having a curved shape corresponding to the steering device 4. Specifically, the mounting surface 12E has the curved shape corresponding to an outer peripheral surface of the curved part 4A. However, the structure of the first end 12A is not limited to this embodiment.

As seen in FIGS. 1 and 2, the base member 12 includes a base body 20 and a grip cover 22. The grip cover 22 at least partly covers the base body 20. The first end 12A, the second end 12B, the grip portion 12C, and the pommel portion 12D are constituted by at least one of the base body 20 and the grip cover 22. The grip cover 22 can be omitted from the base member 12.

Figure 3:
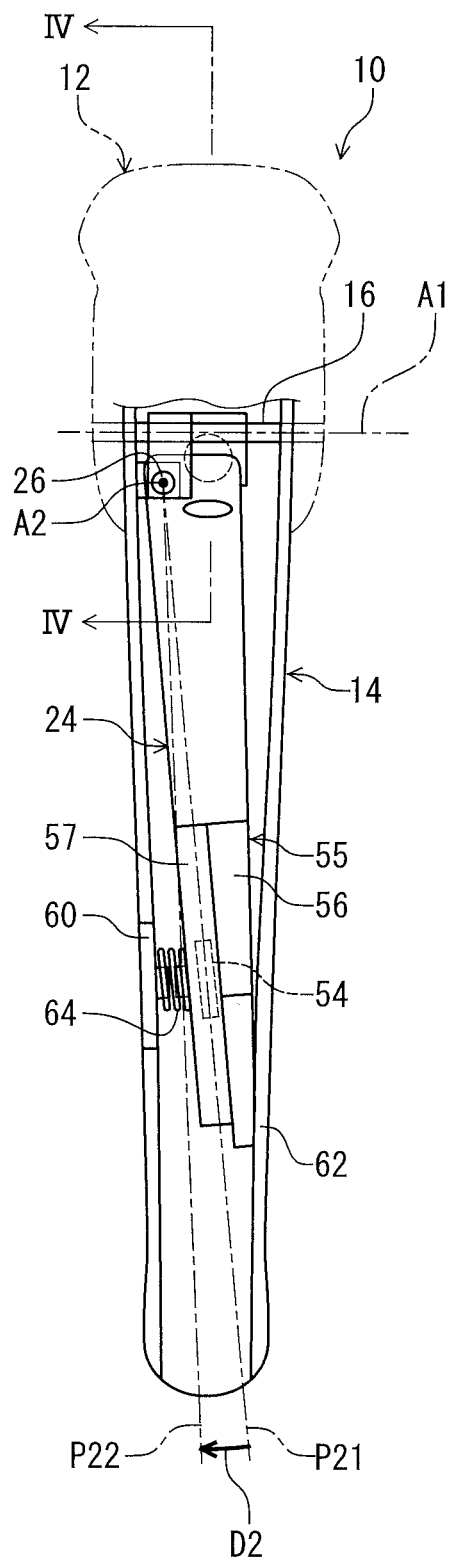
FIG. 3 is a rear view of the operating device illustrated in FIG. 1.

As seen in FIG. 3, the operating device 10 further comprises a second operating member 24 configured to be movably coupled to one of the base member 12 and the first operating member 14. The second operating member 24 is configured to be movably coupled to one of the base member 12 and the first operating member 14 between a second rest position P21 and a second operated position P22. In this embodiment, the second operating member 24 is movably coupled to the first operating member 14 between the second rest position P21 and the second operated position P22. However, the second operating member 24 can be movably coupled to the base member 12.

The second operating member 24 is pivotally coupled to the first operating member 14 about a second pivot axis A2 in a second direction D2. The second operating member 24 is pivotable relative to the first operating member 14 about the second pivot axis A2 between the second rest position P21 and the second operated position P22. In this embodiment, the second operating member 24 is provided as a shift operating lever pivotable about the second pivot axis A2. The second direction D2 is a circumferential direction defined about the second pivot axis A2.

In this embodiment, the second operating member 24 is pivotally coupled to the first operating member 14 via a second pivot pin 26. The second pivot pin 26 defines the second pivot axis A2. The second operating member 24 is biased by a second biasing member (not shown) toward the second rest position P21 relative to the first operating member 14. Thus, the second operating member 24 is in the second rest position P21 in a state where the user does not operate the second operating member 24.

Figure 4:
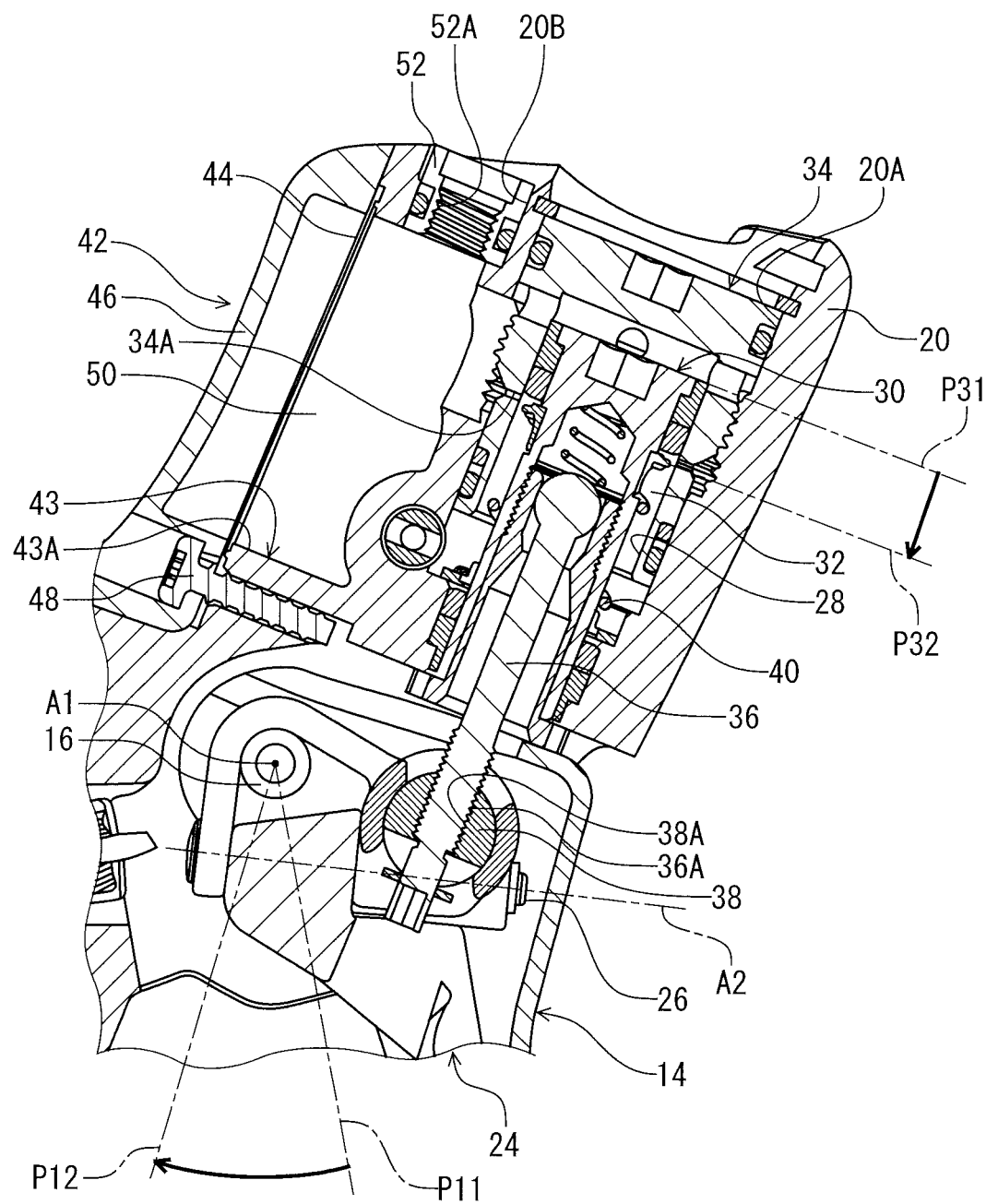
FIG. 4 is a cross-sectional view of the operating device taken along line IV-IV of FIG. 3.

As seen in FIG. 4, the base member 12 includes a cylinder bore 28. The operating device 10 comprises a piston 30. The piston 30 is configured to be movably provided in the cylinder bore 28 and to be pulled in response to a movement of the first operating member 14 from the first rest position P11 toward the first operated position P12. The base member 12 and the piston 30 define a hydraulic chamber 32 in the cylinder bore 28. The piston 30 is movable relative to the base member 12 between an initial position P31 and an actuated position P32. The piston 30 is in the initial position P31 in a state where the first operating member 14 is in the first rest position P11. The piston 30 is in the actuated position P32 in a state where the first operating member 14 is in the first operated position P12. The piston 30 is pulled from the initial position P31 to the actuated position P32 when the first operating member 14 is moved from the first rest position P11 to the first operated position P12.

In this embodiment, the base member 12 includes a cylinder 34. The cylinder 34 includes the cylinder bore 28. The cylinder 34 is a separate member from the base body 20. The base body 20 includes an attachment hole 20A. The cylinder 34 is provided in the attachment hole 20A. The attachment hole 20A includes an attachment threaded hole. The cylinder 34 includes an eternal thread threadedly engaged with the attachment threaded hole. The cylinder bore 28 and the piston 30 define the hydraulic chamber 32 in the cylinder bore 28 and the attachment hole 20A.

The operating device 10 comprises a piston rod 36 and a coupling member 38. The piston rod 36 is coupled to the piston 30. The coupling member 38 is rotatably attached to the first operating member 14. The coupling member 38 includes a threaded hole 38A. The piston rod 36 includes an externally threaded portion 36A. The externally threaded portion 36A threadedly engaged with the threaded hole 38A of the coupling member 38. The piston rod 36 and the coupling member 38 operatively couple the piston 30 to the first operating member 14. The operating device 10 comprises a piston biasing member 40. The piston biasing member 40 is provided in the hydraulic chamber 32 to bias the piston 30 toward the initial position P31.

The base member 12 includes a hydraulic reservoir 42 configured to be connected to the cylinder bore 28. The hydraulic reservoir 42 includes a recess 43, a diaphragm 44, and a lid 46. The recess 43 includes an opening 43A. In this embodiment, the recess 43 is provided at the base body 20. The diaphragm 44 is attached to the base body 20 to cover the opening 43A of the recess 43. The lid 46 is attached to the base body 20 with a fastener 48 to cover the opening 43A and to hold the diaphragm 44. The recess 43 and the diaphragm 44 define a reservoir chamber 50. The cylinder 34 includes connection holes 34A connecting the reservoir chamber 50 to the hydraulic chamber 32. The operating device 10 comprises a bleed member 52. The base body 20 includes a bleed hole 20B connected to the reservoir chamber 50. The bleed member 52 is attached in the bleed hole 20B. The bleed member 52 includes a threaded hole 52A to be threadedly engaged with a bleed plug (not shown).

As seen in FIG. 3, the operating device 10 further comprises an electrical switch 54. The electrical switch 54 is configured to receive a user input. In this embodiment, the electrical switch 54 is provided on the second operating member 24. However, the electrical switch 54 can be provided on other members such as the base member 12 and the first operating member 14. While the electrical switch 54 is a normally open switch in this embodiment, other type of switches can be applied to the operating device 10.

While the electrical switch 54 is used as a shift control switch in this embodiment, the electrical switch 54 can be used as a switch other than the shift control switch. For example, the electrical switch 54 can be used as a suspension control switch in a case where the electrical component BC2 includes the electric suspension. The electrical switch 54 can be used as a seatpost control switch in a case where the electrical component BC2 includes the electric seatpost.

Figure 5:
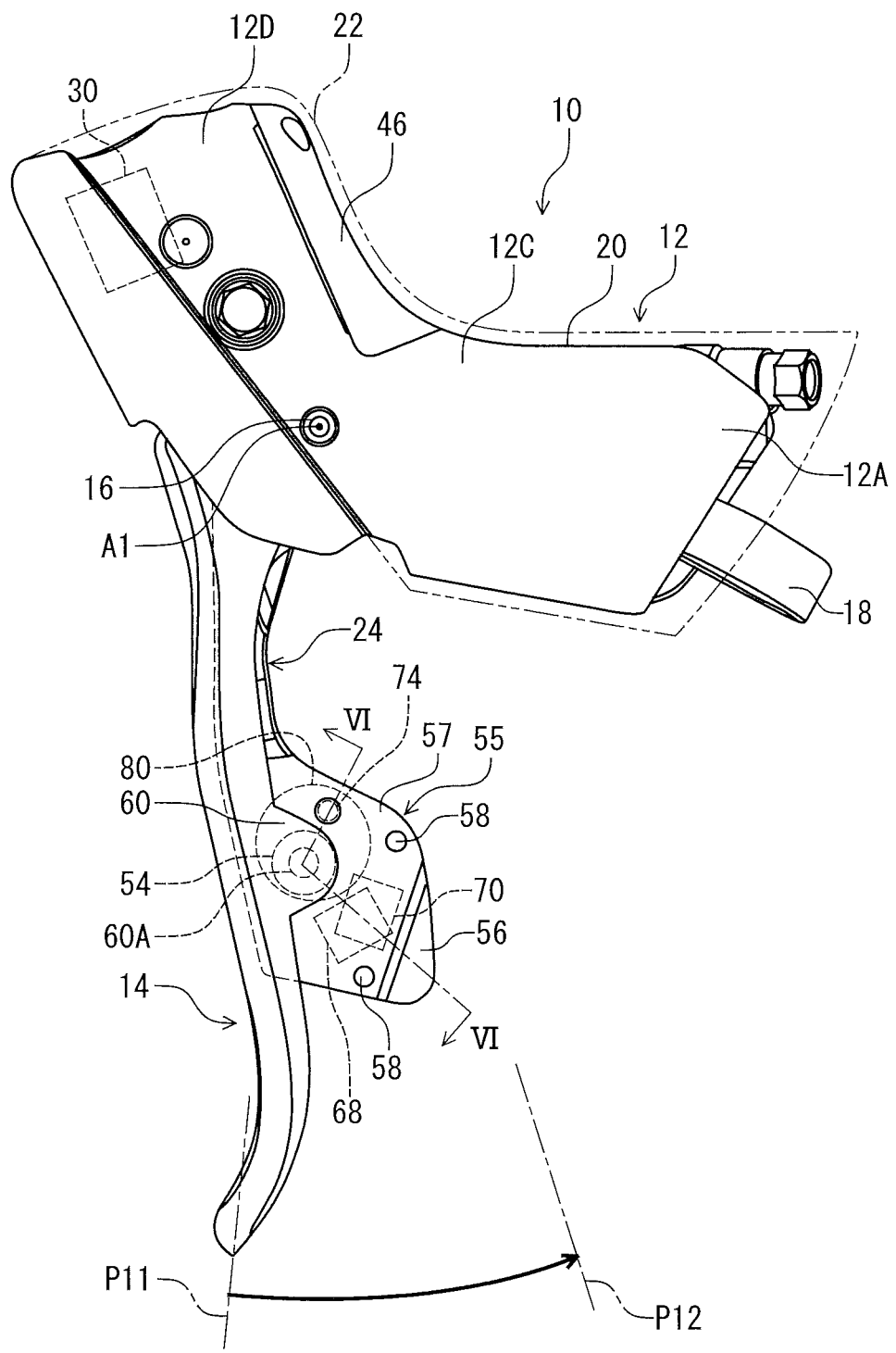
FIG. 5 is a left side elevational view of the operating device illustrated in FIG. 1.

As seen in FIGS. 3 and 5, the operating device 10 further comprises an attachment structure 55. In this embodiment, the attachment structure 55 is provided at the second operating member 24 to move relative to the first operating member 14 along with the second operating member 24. The attachment structure 55 includes an attachment part 56 and a cover 57. The attachment part 56 is coupled to an end of the second operating member 24. The cover 57 is detachably attached to the attachment part 56 with fasteners 58 such as screws.

Figure 6:
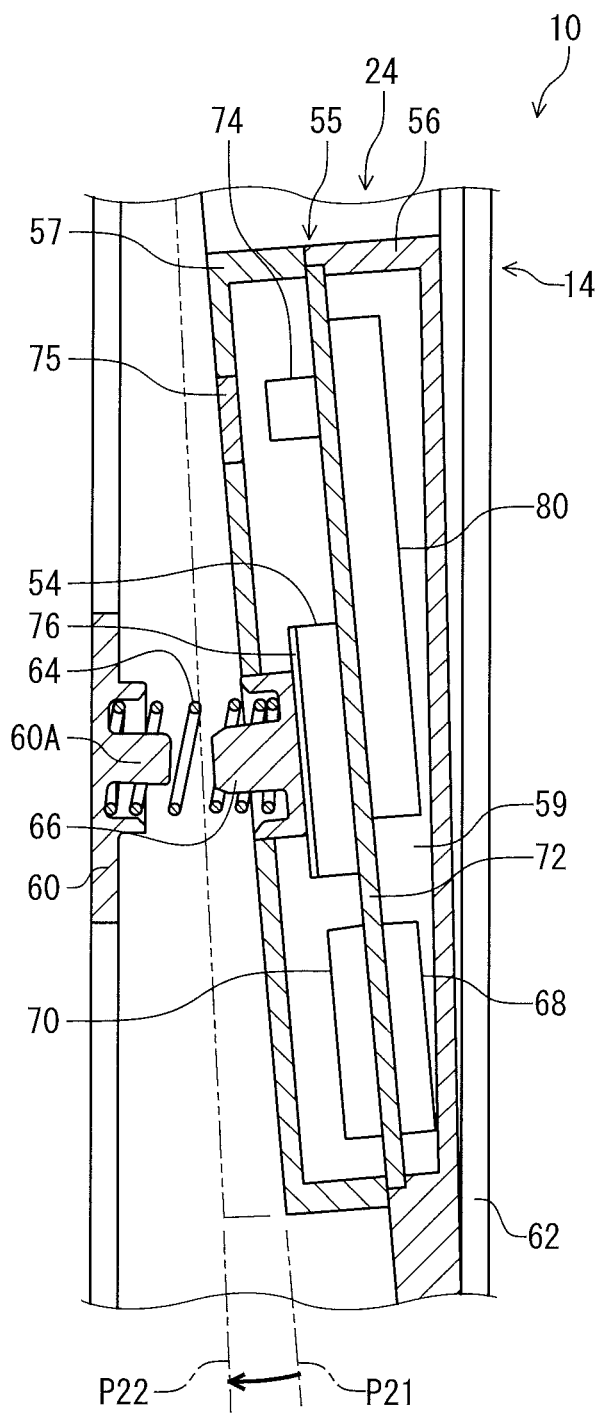
FIG. 6 is a cross-sectional view of the operating device taken along line VI-VI of FIG. 5.

As seen in FIG. 6, the attachment part 56 and the cover 57 define an internal space 59. The internal space 59 is sealed by seal members (not shown) in a state where the cover 57 is attached to the attachment part 56. The electrical switch 54 is disposed in the internal space 59 of the attachment structure 55.

The operating device 10 further comprises an actuation part 60. The actuation part 60 is provided at the first operating member 14 to move relative to the base member 12 along with the first operating member 14. The actuation part 60 is disposed to face toward the electrical switch 54 to press the electrical switch 54 in response to the movement of the second operating member 24 in the second direction D2 relative to the first operating member 14. The actuation part 60 can be disposed at other positions such as the base member 12 and the second operating member 24.

The actuation part 60 includes a projection 60A to face the electrical switch 54. The first operating member 14 includes a receiving part 62. The receiving part 62 is spaced part from the actuation part 60 in the second direction D2. The electrical switch 54 and the attachment part 56 are disposed between the actuation part 60 and the receiving part 62 in the second direction D2. The second operating member 24 is contactable with the receiving part 62. The second operating member 24 is positioned in the second rest position P21 by the receiving part 62 in a state where the second operating member 24 is in contact with the receiving part 62.

The operating device 10 comprises a switch biasing member 64. The switch biasing member 64 is disposed between the electrical switch 54 and the actuation part 60 to bias the second operating member 24 toward the second rest position P21. Thus, the second operating member 24 is positioned in the second rest position P21 by the receiving part 62 in a state where the user does not operate the second operating member 24.

The operating device 10 comprise a button 66 to transmit, to the electrical switch 54, the movement of the second operating member 24 in the second direction D2 relative to the first operating member 14. The button 66 is disposed on the second operating member 24 to face the actuation part 60 in the second direction D2. Specifically, the button 66 is disposed to face toward the projection 60A in the second direction D2. In this embodiment, the switch biasing member 64 includes a coil spring. The switch biasing member 64 is held by the projection 60A and the button 66.

The projection 60A of the actuation part 60 presses the button 66 to operate the electrical switch 54 in a state where the user presses the second operating member 24 toward the second operated position P22. The projection 60A is spaced apart from the button 66 not to operate the electrical switch 54 in a state where the second operating member 24 is in the second rest position P21.

As seen in FIG. 6, the operating device 10 further comprises a controller 68 configured to generate an operation signal in response to an operation of the electrical switch 54. The controller 68 is configured to be provided on at least one of the base member 12, the first operating member 14, and the second operating member 24. In this embodiment, the controller 68 is provided on the second operating member 24. However, the controller 68 is provided on other members such as the base member 12 and the first operating member 14.

The operating device 10 further comprises a communicator 70 configured to wirelessly transmit the operation signal generated by the controller 68. The communicator 70 is configured to be provided on at least one of the base member 12, the first operating member 14, and the second operating member 24. In this embodiment, the communicator 70 is provided on the second operating member 24. However, the communicator 70 can be provided on other members such as the base member 12 and the first operating member 14.

Figure 7:
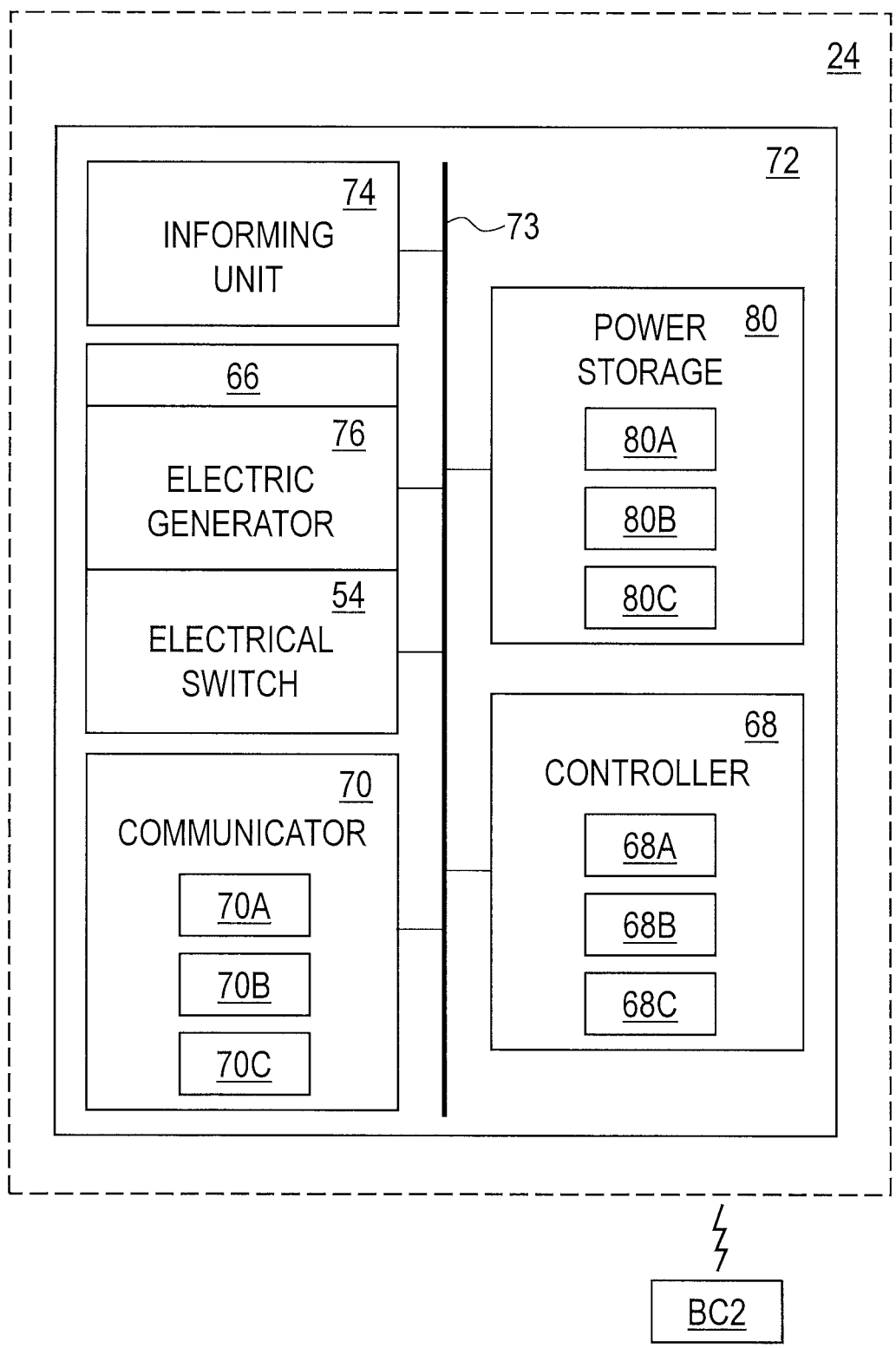
FIG. 7 is a schematic block diagram of the operating device illustrated in FIG. 1.

As seen in FIG. 7, the controller 68 is electrically connected to the electrical switch 54 to generate the operation signal in response to the operation of the electrical switch 54. The communicator 70 is electrically connected to the electrical switch 54 to wirelessly transmit the operation signal to the electrical component BC2.

The operating device 10 comprises a circuit board 72 and a bus 73. The bus 73 is electrically connected to the circuit board 72. The electrical switch 54, the controller 68, and the communicator 70 are electrically mounted on the circuit board 72 and is electrically connected to each other with the circuit board 72 and the bus 73. The circuit board 72 is secured to the second operating member 24 (e.g., the attachment part 56). As seen in FIG. 6, the controller 68, the communicator 70, and the circuit board 72 are disposed in the internal space 59 of the attachment part 56.

As seen in FIG. 7, in this embodiment, the controller 68 includes a processor 68A, a memory 68B, and a signal generating circuit 68C. The communicator 70 includes a signal transmitting circuit 70A, a signal receiving circuit 70B, and an antenna 70C. Thus, the controller 68 can also be referred to as controller circuitry 68 in the present application. The communicator 70 can also be referred to as communication circuitry 70 in the present application.

The processor 68A includes a central processing unit (CPU) and a memory controller. The memory 68B is connected to the processor 68A. The memory 68B includes a read only memory (ROM) and a random-access memory (RAM). The ROM includes a non-transitory computer-readable storage medium. The RAM includes a transitory computer-readable storage medium. The memory 68B includes storage areas each having an address in the ROM and the RAM. The processor 68A controls the memory 68B to store data in the storage areas of the memory 68B and reads data from the storage areas of the memory 68B. The memory 68B (e.g., the ROM) stores a program. The program is read into the processor 68A, and thereby functions of the communicator 70 (e.g., at least part of functions of the signal generating circuit 68C and the signal transmitting circuit 70A) are performed.

The signal generating circuit 68C generates wireless signals based on the operation of the electrical switch 54. The signal generating circuit 68C superimposes digital signal on carrier wave using a predetermined wireless communication protocol to generate the wireless signals. The signal transmitting circuit 70A wirelessly transmits the wireless signals via the antenna 70C in response to the operation of the electrical switch 54. In this embodiment, the signal generating circuit 68C can encrypt control information (e.g., shift information) to generate encrypted wireless signals. The signal generating circuit 68C encrypts digital signals stored in the memory 68B using a cryptographic key. The signal transmitting circuit 70A transmits the encrypted wireless signals. Thus, the communicator 70 wirelessly transmits the wireless signals to operate the electrical component BC2 when the user operates the electrical switch 54.

Further, the signal receiving circuit 70B receives a wireless signal from the electrical component BC2 via the antenna 70C. In this embodiment, the signal receiving circuit 70B decodes the wireless signal to recognize information wirelessly transmitted from the electrical component BC2. The signal receiving circuit 70B may decrypt the encrypted wireless signal using the cryptographic key. Namely, the communicator 70 is configured to transmit a wireless signal to control other electrical components of the human powered vehicle and to receive a wireless signal to recognize information from other electrical components of the human powered vehicle. In other words, the communicator 70 is provided as a wireless transmitter and a wireless receiver. The other electrical components of the human powered vehicle can include the electric suspension and the electric seatpost in addition to the electrical component BC2. In this embodiment, the communicator 70 is integrally provided as a single module or unit. However, the communicator 70 can be constituted of a wireless transmitter and a wireless receiver which are provided as separate modules or units arranged at different positions from each other. The signal receiving circuit 70B can be omitted from the communicator 70.

As seen in FIG. 7, the operating device 10 further comprises an informing unit 74. The informing unit 74 is electrically connected to the communicator 70 to inform a user of a status of the communicator 70.

The informing unit 74 is provided on at least one of the base member 12, the first operating member 14, and the second operating member 24. In this embodiment, as seen in FIG. 6, the informing unit 74 is provided on the second operating member 24. However, the informing unit 74 can be provided on other members such as the base member 12 and the first operating member 14 instead of or in addition to on the second operating member 24. Examples of the status of the communicator 70 include a signal transmission status and a power supply status.

The informing unit 74 is mounted on the circuit board 72. The informing unit 74 is disposed in the internal space 59 of the attachment part 56. The informing unit 74 is electrically connected to the communicator 70 via the circuit board 72. The informing unit 74 includes a light emitting element such as a light emitting diode (LED). However, the informing unit 74 can include other elements such as a buzzer instead of or in addition to the light emitting element. Light from the informing unit 74 is visible from outside of the operating device 10 via a clear window 75 of the cover 57.

As seen in FIG. 7, the operating device 10 comprises an electric generator 76. The electric generator 76 is configured to generate electric power in accordance with a physical change applied to the operating device 10. The electric generator 76 is configured to generate the electric power in response to the operation of the electrical switch 54. Examples of the physical change applied to the operating device 10 include pressure and/or vibration caused by a movement of at least one of the first operating member 14, the second operating member 24, the electrical switch 54, and the button 66.

The electric generator 76 includes a piezoelectric element. The piezoelectric element is configured to convert the physical change (e.g., pressure and/or vibration) to the electric power. However, the electric generator 76 is not limited to this embodiment. The electric generator 76 can include another element instead of or in addition to the piezoelectric element. The electric generator 76 is electrically connected to the controller 68, the communicator 70, and the informing unit 74 with the circuit board 72 and the bus 73.

As seen in FIG. 6, the electric generator 76 is provided on at least one of the base member 12, the first operating member 14, and the second operating member 24. In this embodiment, the electric generator 76 is provided on the second operating member 24. However, the electric generator 76 can be provided on other members such as the base member 12 and the first operating member 14.

In this embodiment, the electric generator 76 is attached to the electrical switch 54 and is disposed between the electrical switch 54 and the button 66. However, the electric generator 76 can be disposed in other positions.

Both of the electrical switch 54 and the electric generator 76 are provided on at least one of the base member 12, the first operating member 14, and the second operating member 24. In this embodiment, both of the electrical switch 54 and the electric generator 76 are provided on the second operating member 24. However, both of the electrical switch 54 and the electric generator 76 can be provided on other members such as the base member 12 and the first operating member 14.

As seen in FIG. 7, the operating device 10 comprises a power storage 80 configured to be charged. The power storage 80 is configured to be charged with the electric power generated by the electric generator 76. The electric generator 76 is electrically mounted on the circuit board 72 and is electrically connected to the controller 68, the communicator 70, the informing unit 74, and the electric generator 76 with the circuit board 72 and the bus 73. The power storage 80 is electrically connected to the electric generator 76 to be charged with the electric power generated by the electric generator 76. The power storage 80 is electrically connected to the controller 68, the communicator 70, and the informing unit 74 to supply the electric power charged in the power storage 80.

The power storage 80 includes a rectifying circuit 80B and a voltage controller 80C. The rectifying circuit 80B is electrically connected to the electric generator 76 to rectify the electric power generated by the electric generator 76. The rectifying circuit 80B is electrically mounted on the circuit board 72 and is electrically connected to the controller 68, the communicator 70, and the electric generator 76.

The power storage 80 includes a voltage controller 80C. The voltage controller 80C is configured to regulate the power source voltage to a level at which various circuits of the controller 68, the communicator 70, and the informing unit 74 can properly operate. The voltage controller 80C is configured to supply the regulated voltage to the controller 68, the communicator 70, and the informing unit 74.

The power storage 80 includes at least one of a hydrogen powered fuel cell, a rechargeable battery, and a capacitor. In this embodiment, the power storage 80 includes a capacitor 80A configured to be charged with the electric power generated by the electric generator 76. However, the power storage 80 can include a hydrogen powered fuel cell and a rechargeable battery instead of or in addition to the capacitor 80A.

As seen in FIG. 6, the power storage 80 is configured to be provided on at least one of the base member 12, the first operating member 14, and the second operating member 24. In this embodiment, the power storage 80 is provided on the second operating member 24. However, the power storage 80 can be provided on other members such as the base member 12 and the first operating member 14.

Second Embodiment

An operating device 210 in accordance with a second embodiment will be described below referring to FIGS. 8 to 10. The operating device 210 has the same structure and/or configuration as those of the operating device 10 except for the arrangement of the components. Thus, elements having substantially the same function as those in the first embodiment will be numbered the same here and will not be described and/or illustrated again in detail here for the sake of brevity.

Figure 8:
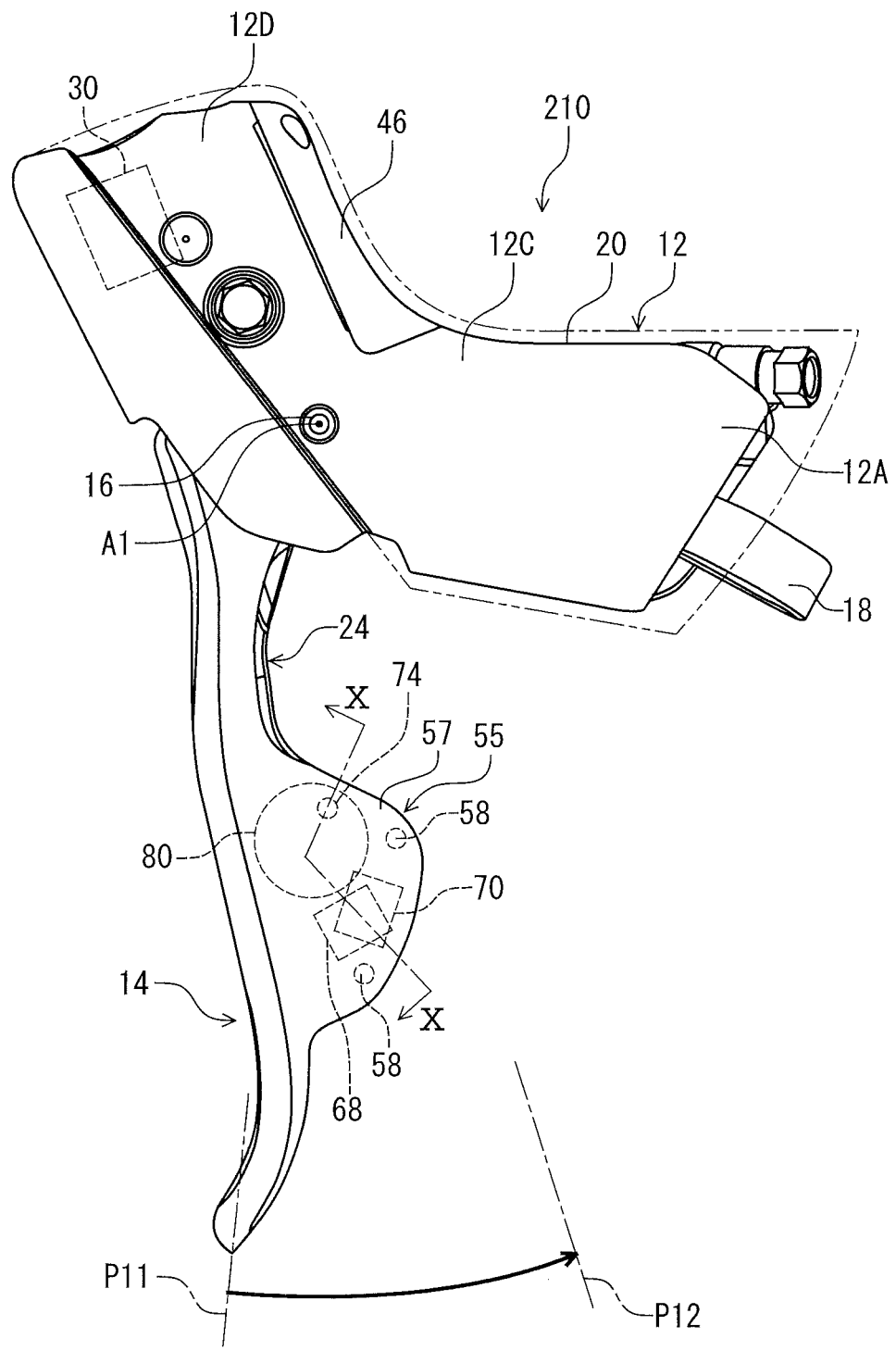
FIG. 8 is a left side elevational view of an operating device in accordance with a second embodiment.
Figure 9:
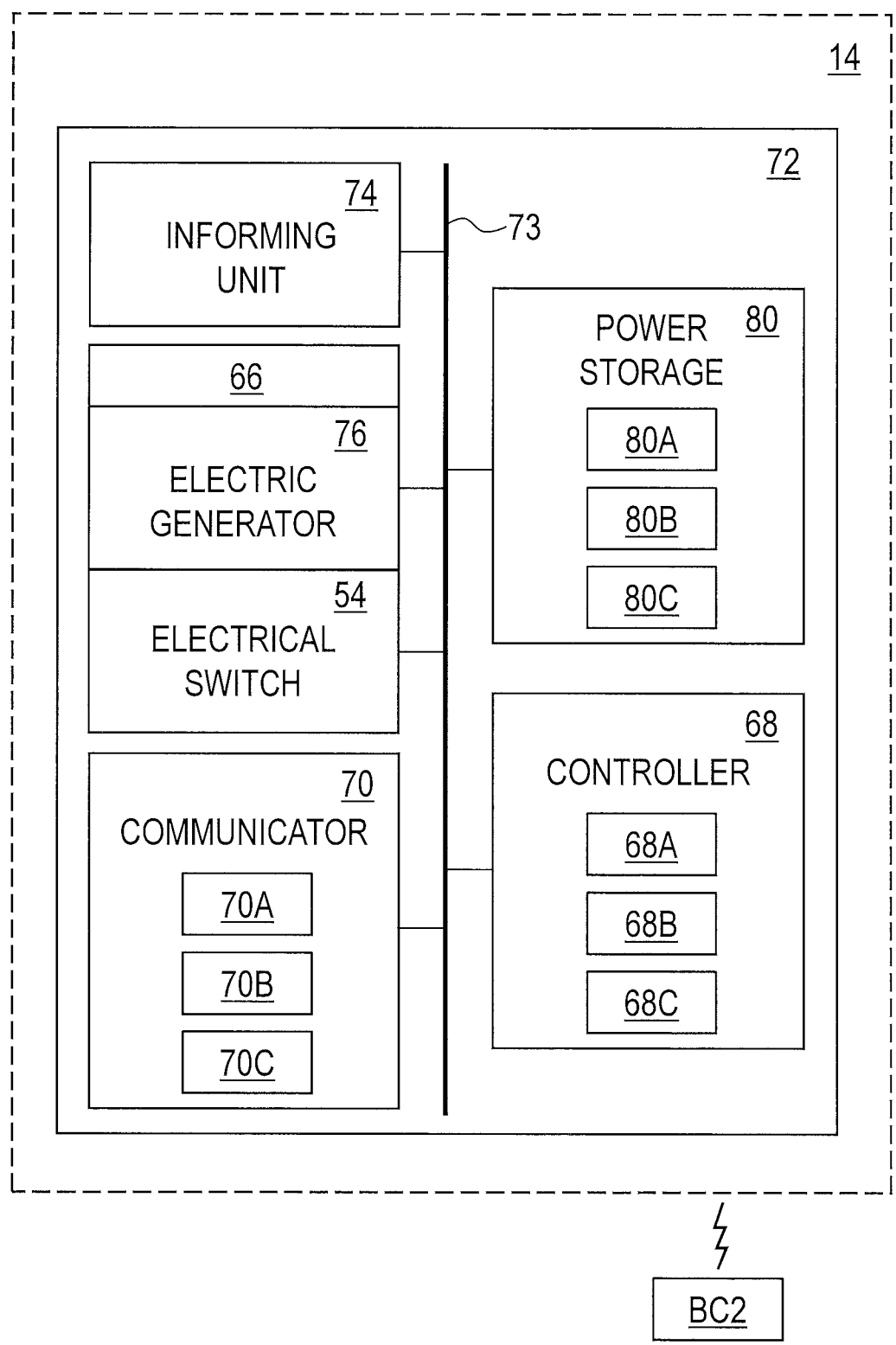
FIG. 9 is a schematic block diagram of the operating device illustrated in FIG. 8.

As seen in FIGS. 8 and 9, the operating device 210 for the human powered vehicle 2 comprises the base member 12, the first operating member 14, the piston 30, and the electric generator 76. The operating device 210 further comprises the second operating member 24. The operating device 210 further comprises the power storage 80. The operating device 210 further comprises the electrical switch 54. The operating device 210 further comprises the communicator 70. In this embodiment, the electric generator 76, the power storage 80, the electrical switch 54, and the communicator 70 are provided on the first operating member 14. The attachment structure 55 is provided at the first operating member 14.

Figure 10:
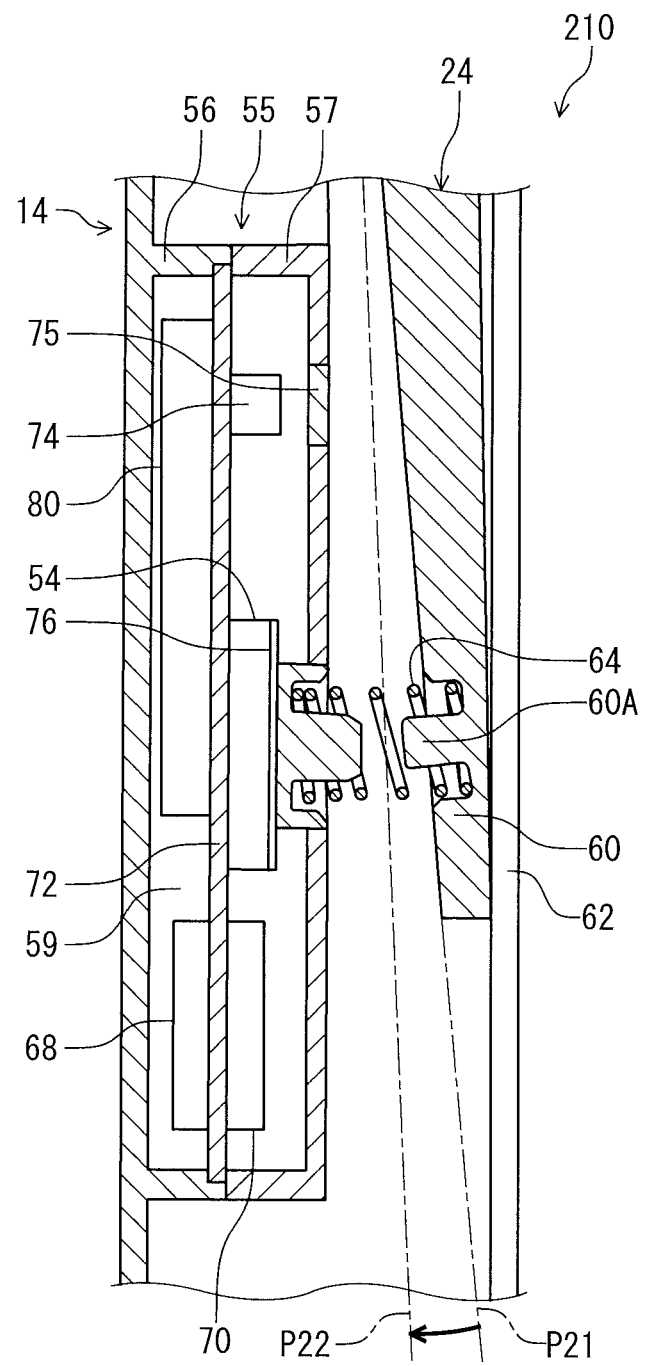
FIG. 10 is a cross-sectional view of the operating device taken along line X-X of FIG. 8.

As seen in FIG. 10, the actuation part 60 is provided at the second operating member 24. The actuation part 60 is disposed to face toward the electrical switch 54 to press the electrical switch 54 in response to the movement of the second operating member 24 in the second direction D2 relative to the first operating member 14. The attachment part 56 is coupled to the first operating member 14.

Third Embodiment

An operating device 310 in accordance with a third embodiment will be described below referring to FIGS. 11 to 13. The operating device 310 has the same structure and/or configuration as those of the operating device 10 except for the arrangement of the components. Thus, elements having substantially the same function as those in the above embodiment will be numbered the same here and will not be described and/or illustrated again in detail here for the sake of brevity.

Figure 11:
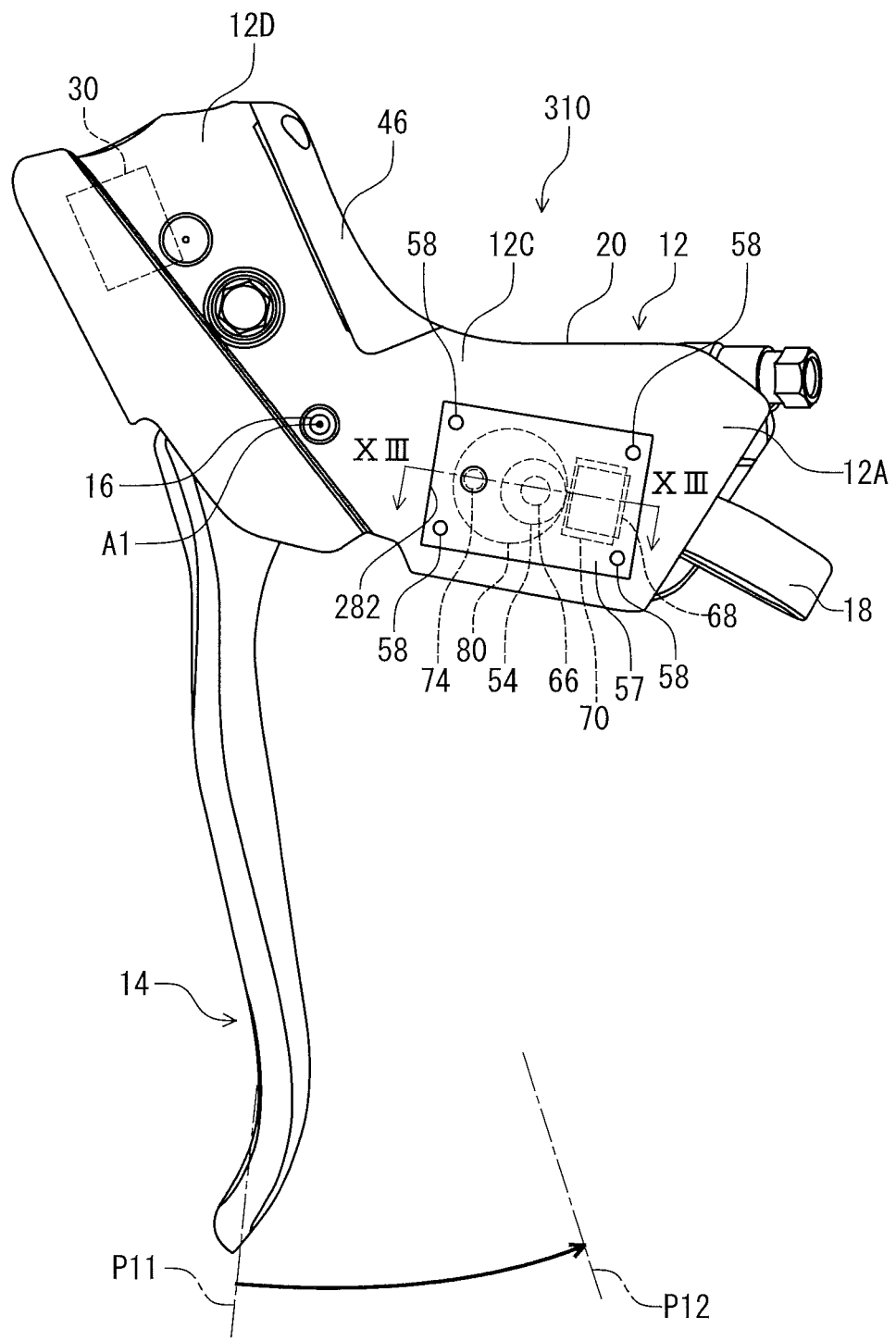
FIG. 11 is a left side elevational view of an operating device in accordance with a third embodiment.
Figure 12:
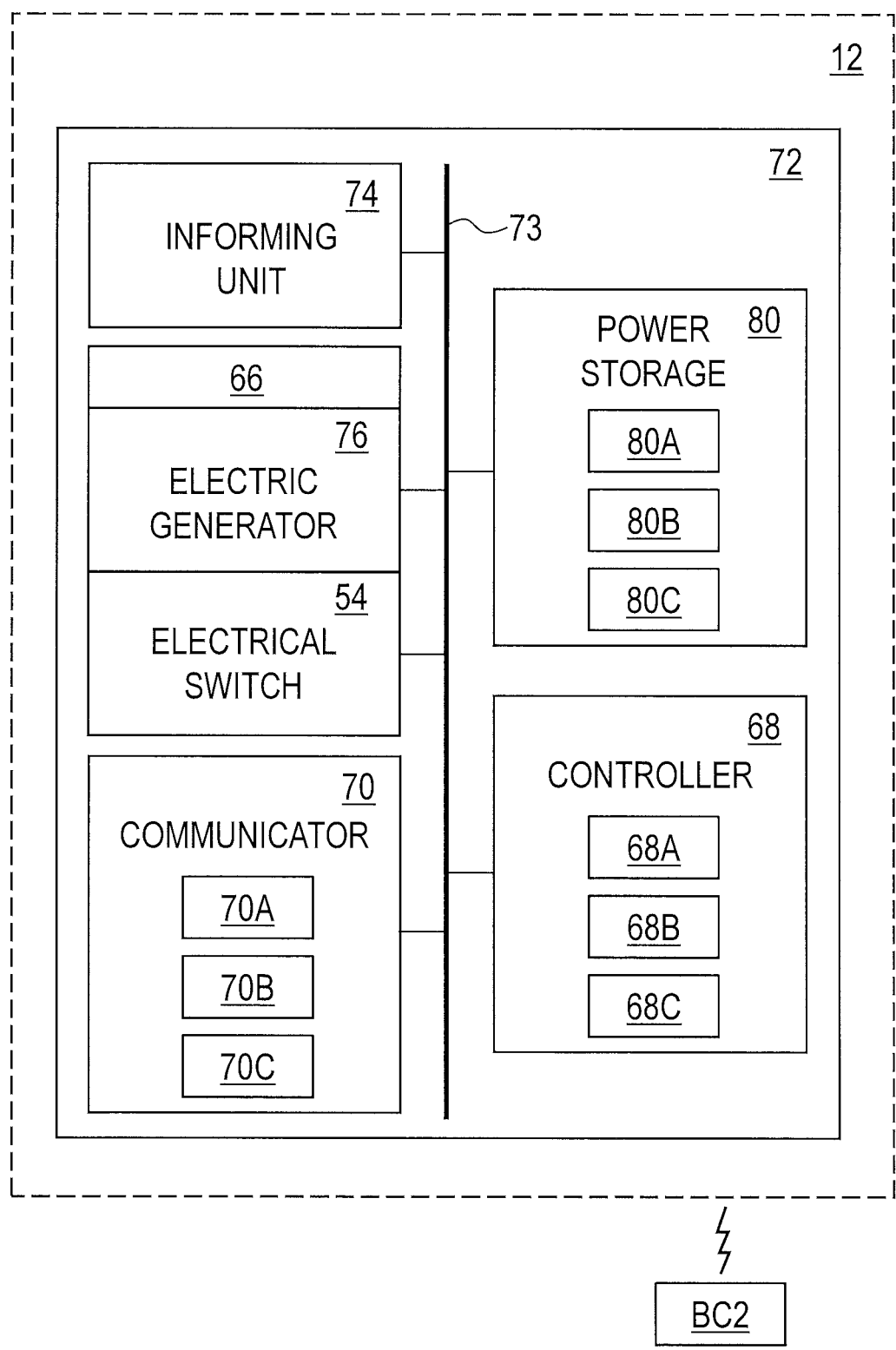
FIG. 12 is a schematic block diagram of the operating device illustrated in FIG. 11.

As seen in FIGS. 11 and 12, the operating device 310 for the human powered vehicle 2 comprises the base member 12, the first operating member 14, the piston 30, and the electric generator 76. The operating device 310 further comprises the power storage 80. The operating device 310 further comprises the electrical switch 54. The operating device 310 further comprises the communicator 70. In this embodiment, the electric generator 76, the power storage 80, the electrical switch 54, and the communicator 70 are provided on the base member 12. The attachment structure 55 is provided at the base member 12.

Figure 13:
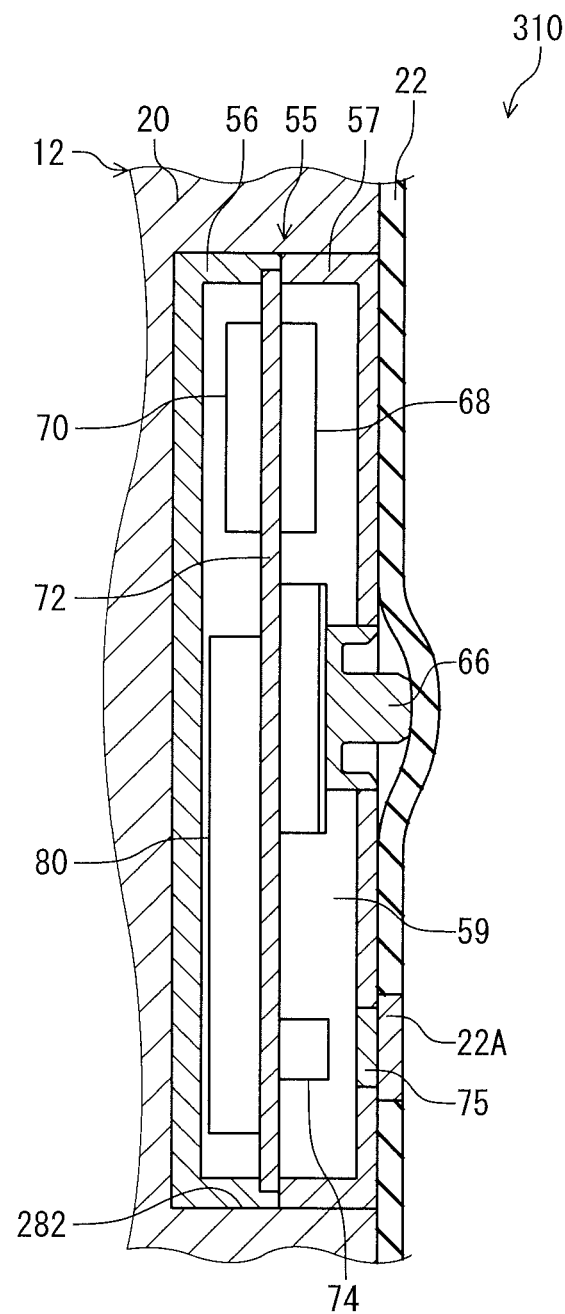
FIG. 13 is a cross-sectional view of the operating device taken along line XIII-XIII of FIG. 11.

As seen in FIG. 11, the actuation part 60 is omitted from the operating device 310. As seen in FIG. 13, the attachment structure 55 is provided at the base member 12. The base member 12 includes an internal cavity 282. The attachment structure 55 is provided in the internal cavity 282. In this embodiment, the attachment part 56 is attached to the base member 12. The cover 57 is detachably attached to the attachment part 56. However, the attachment part 56 can be omitted from the attachment structure 55. In such an embodiment, for example, the circuit board 72 and the cover 57 are directly attached to the base member 12. Light from the informing unit 74 is visible from outside of the operating device 310 via the clear window 75 of the cover 57 and a clear window 22A of the grip cover 22.

Fourth Embodiment

An operating device 410 in accordance with a fourth embodiment will be described below referring to FIGS. 14 to 16. The operating device 410 has the same structure and/or configuration as those of the operating device 10 except for the arrangement of the power storage. Thus, elements having substantially the same function as those in the above embodiment will be numbered the same here and will not be described and/or illustrated again in detail here for the sake of brevity.

Figure 14:
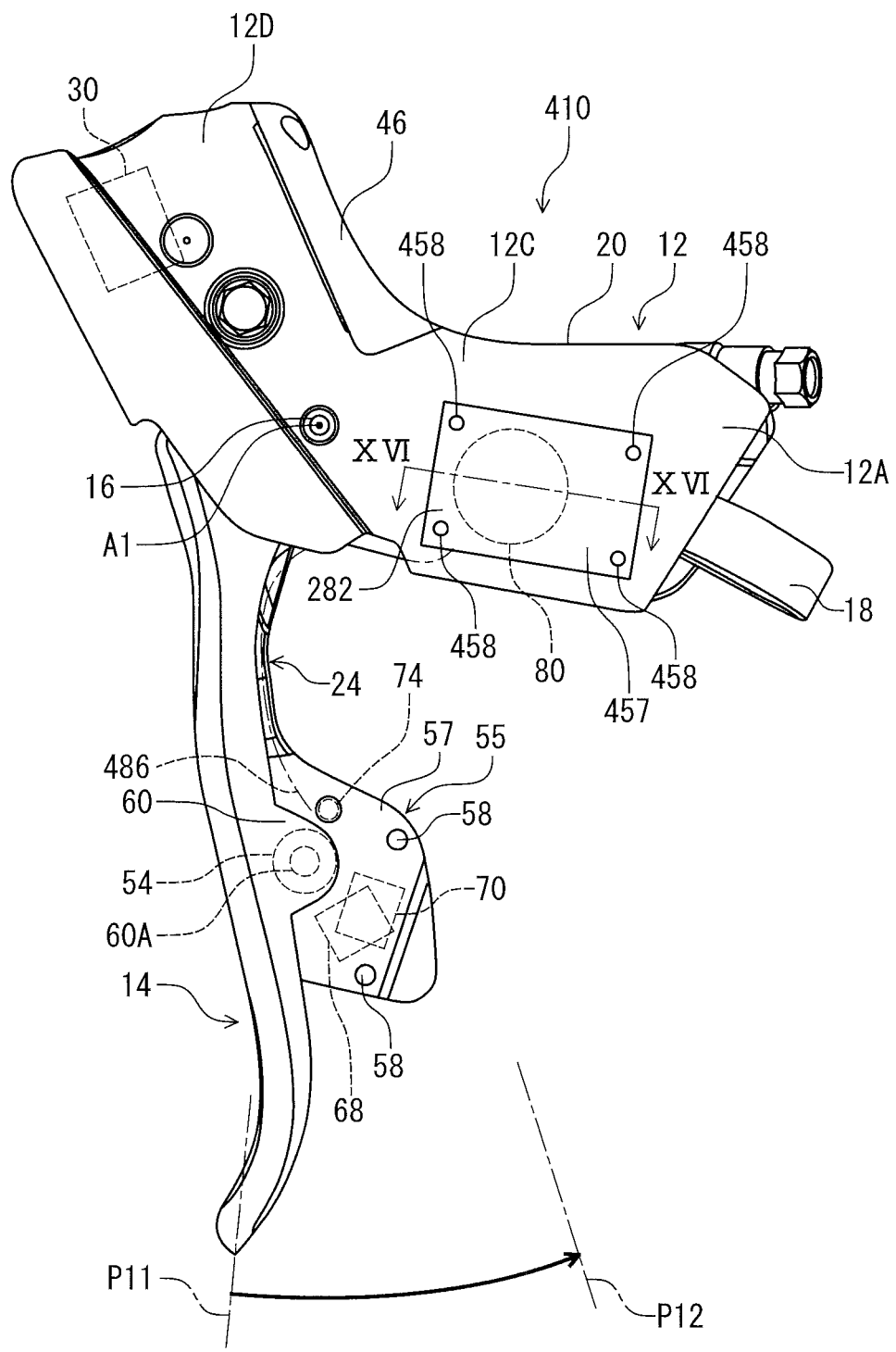
FIG. 14 is a left side elevational view of an operating device in accordance with a fourth embodiment.
Figure 15:
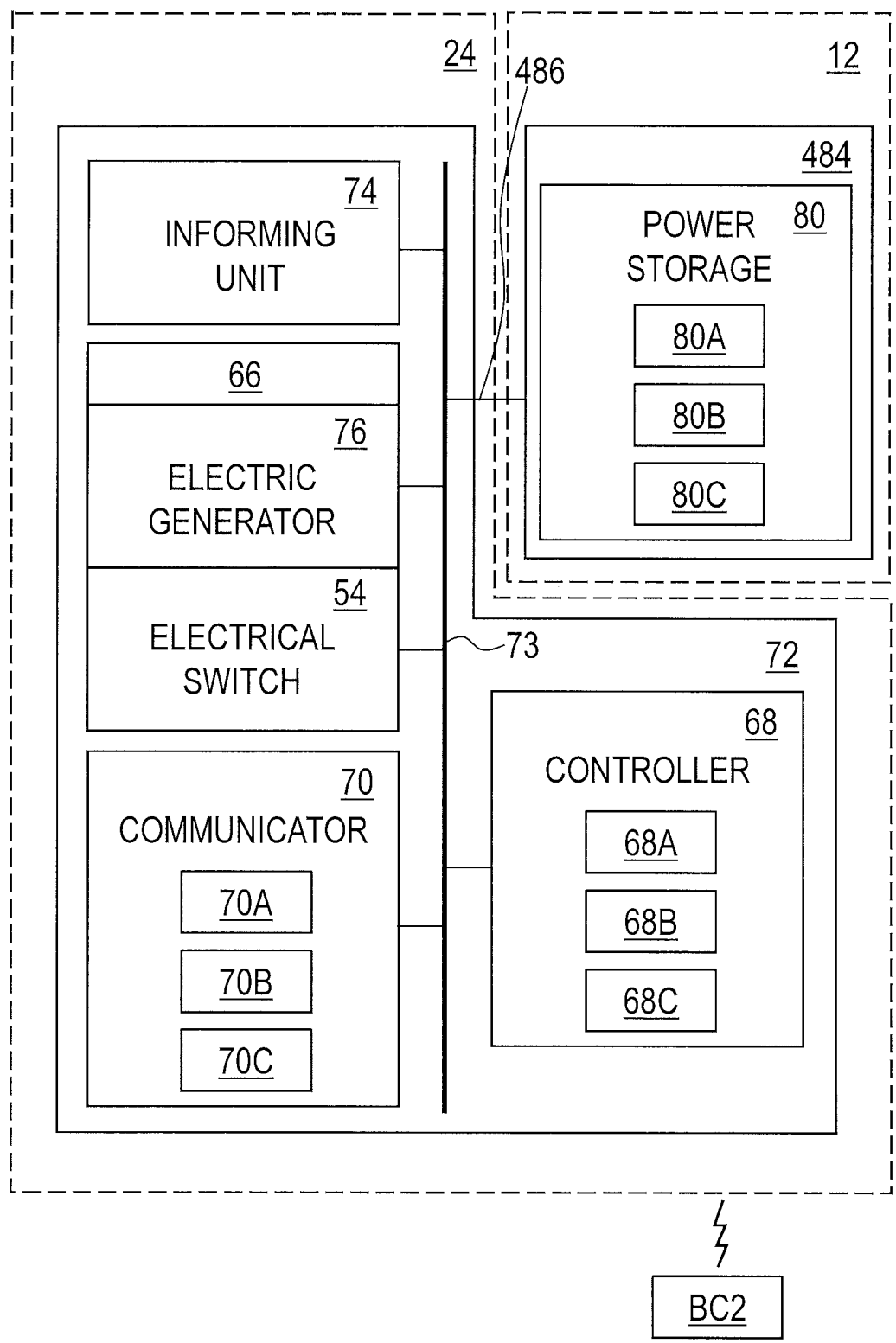
FIG. 15 is a schematic block diagram of the operating device illustrated in FIG. 14.

As seen in FIGS. 14 and 15, the operating device 410 for the human powered vehicle 2 comprises the base member 12, the first operating member 14, the piston 30, and the electric generator 76. The operating device 410 further comprises the second operating member 24. The operating device 410 further comprises the power storage 80. The operating device 410 further comprises the electrical switch 54. The operating device 410 further comprises the communicator 70. In this embodiment, the electric generator 76, the electrical switch 54, and the communicator 70 are provided on the second operating member 24. However, the power storage 80 is provided on the base member 12.

Figure 16:
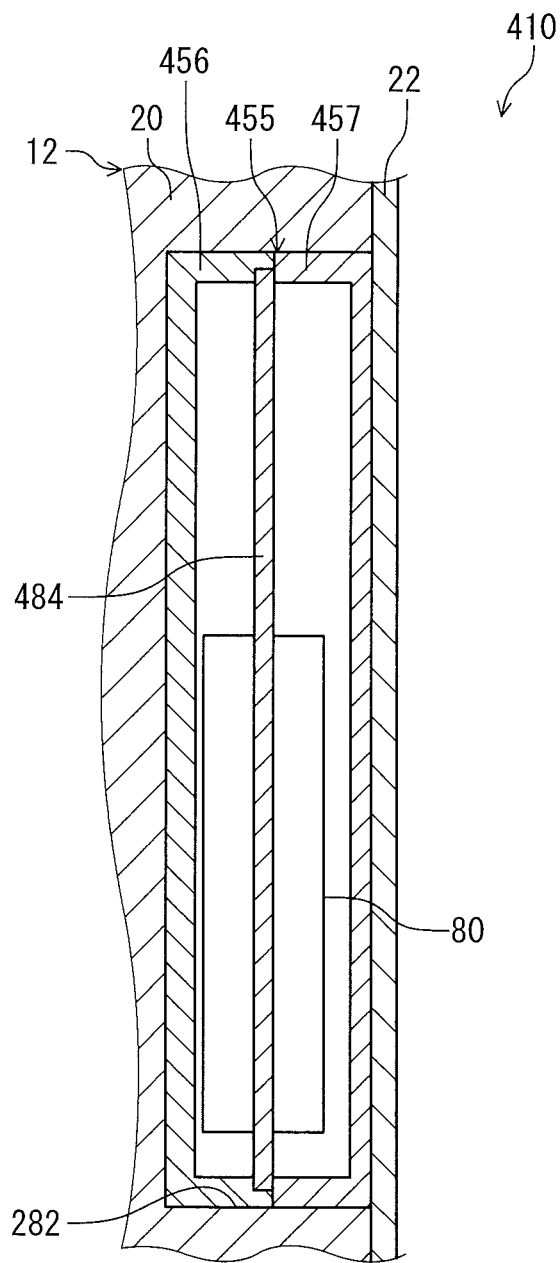
FIG. 16 is a cross-sectional view of the operating device taken along line XVI-XVI of FIG. 14.

As seen in FIG. 16, the operating device 410 further comprises an additional attachment structure 455. The additional attachment structure 455 includes an attachment part 456 and a cover 457. The attachment part 456 is provided in the internal cavity 282 and is attached to the base member 12. The cover 457 is detachably attached to the attachment part 456 via fasteners 458.

The operating device 410 further comprises a circuit board 484. The circuit board 484 is attached to the base member 12. The power storage 80 is electrically mounted on the circuit board 484. The circuit board 484 is electrically connected to the bus 73 with an electric cable 486. Thus, the power storage 80 is electrically connected to the electric generator 76, the electrical switch 54, and the communicator 70.

Modifications

Other arrangements of the electrical switch 54, the communicator 70, the electric generator 76, and the power storage 80 can be combined with each other described in the above embodiments.

Figure 17:
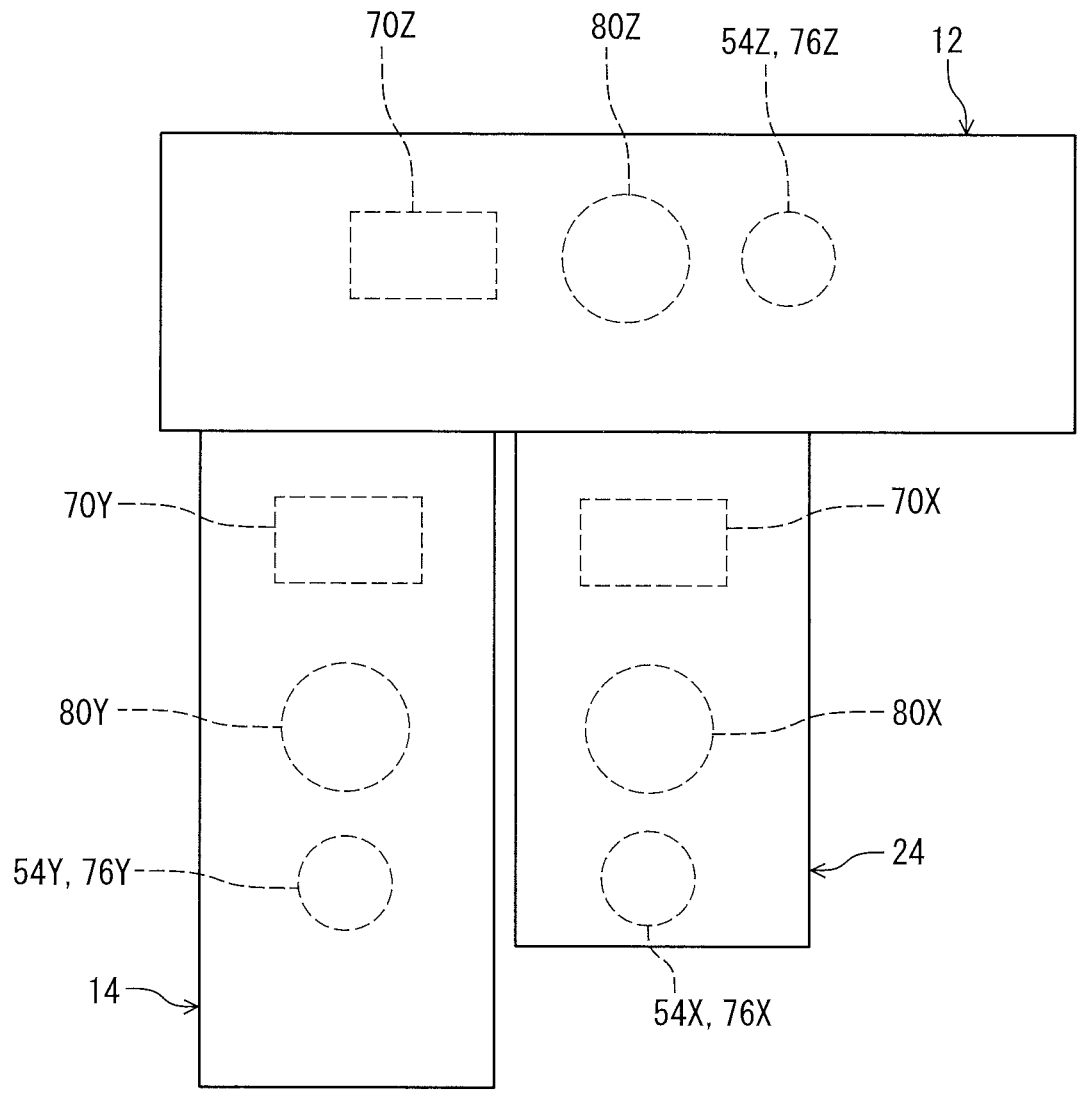
FIG. 17 is a schematic diagram showing arrangements of elements of the operating device.

FIG. 17 shows arrangements of the electrical switch 54, the communicator 70, the electric generator 76, and the power storage 80. FIGS. 18 to 23 shows combinations of the arrangements of the electrical switch 54, the communicator 70, the electric generator 76, and the power storage 80.

In FIG. 17, the electrical switch 54X indicates that the electrical switch 54 is disposed at the second operating member 24. The electrical switch 54Y indicates that the electrical switch 54 is disposed at the first operating member 14. The electrical switch 54Z indicates that the electrical switch 54 is disposed at the base member 12. The electric generator 76X indicates that the electric generator 76 is disposed at the second operating member 24. The electric generator 76Y indicates that the electric generator 76 is disposed at the first operating member 14. The electric generator 76Z indicates that the electric generator 76 is disposed at the base member 12. The communicator 70X indicates that the communicator 70 is disposed at the second operating member 24. The communicator 70Y indicates that the communicator 70 is disposed at the first operating member 14. The communicator 70Z indicates that the communicator 70 is disposed at the base member 12. The power storage 80X indicates that the power storage 80 is disposed at the second operating member 24. The power storage 80Y indicates that the power storage 80 is disposed at the first operating member 14. The power storage 80Z indicates that the power storage 80 is disposed at the base member 12.

In FIGS. 18 to 23, each circle indicates the arrangement of each element. As seen in FIG. 18, the combination of the electrical switch 54X, the electric generator 76X, the communicator 70X, and the power storage 80X correspond to the first embodiment. The combination of the electrical switch 54X, the electric generator 76X, the communicator 70X, and the power storage 80Z correspond to the fourth embodiment. As seen in FIG. 20, the combination of the electrical switch 54Y, the electric generator 76Y, the communicator 70Y, and the power storage 80Y corresponds to the second embodiment. As seen in FIG. 22, the combination of the electrical switch 54Z, the electric generator 76Z, the communicator 70Z, and the power storage 80Z corresponds to the third embodiment.

As seen in FIGS. 18 to 23, the electrical switch 54 can be provided on one of the base member 12, the first operating member 14, and the second operating member 24. The electrical switches 54 can be provided on both the first operating member 14 and the second operating member 24. The electrical switches 54 can be provided on both the base member 12 and the second operating member 24. The electrical switches 54 can be provided on both the base member 12 and the first operating member 14. Furthermore, the electrical switches 54 can be provided on all the base member 12, the first operating member 14, and the second operating member 24. The same can apply to the arrangement of each of the electric generator 76, the communicator 70, and the power storage 80. Each of modifications M1-1 to M1-47, M2-1 to M2-48, and M3-1 to M3-48 can apply to the operating device of the present application.

In the above embodiments and modifications, both of the electrical switch 54 and the electric generator 76 are provided on the same member. However, the electric generator 76 can be provided on a member different from a member on which the electrical switch 54 is provided. Furthermore, the communicator 70 can be provided on a plurality of members as well as the electrical switch 54, the electric generator 76, and the power storage 80.

In the above embodiments, the electric generator 76 is configured to generate the electric power in response to the operation of the electrical switch 54. However, the electric generator 76 can be configured to generate electric power in response to a movement of the first operating member 14 and/or a movement of the second operating member 24.

In the above embodiment, the second operating member 24 is movably coupled to the first operating member 14. However, the second operating member 24 can be movably coupled to the base member 12.

It will be apparent to those skilled in the field of the human powered vehicle from the present disclosure that the above embodiments can be at least partly combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating device for a human powered vehicle, comprising:
a base member including a cylinder bore;
a first operating member configured to be movably coupled to the base member about a pivot axis between a first rest position and a first operated position;
a piston configured to be movably provided in the cylinder bore and to be pulled by a piston rod connected to the first operating member in response to a movement of the first operating member from the first rest position toward the first operated position, the piston is pulled from an initial position to an actuated position when the first operating member is moved from the first rest position to the first operated position, the actuated position is closer to the first operating member than the initial position in a state where viewed from a direction parallel to the pivot axis, the base member includes a first end portion configured to be coupled to a handlebar, and a second end portion opposite to the first end portion, the cylinder bore and the piston are provided to the second end portion;
an electric generator configured to generate electric power in accordance with a physical change applied to the operating device; and
a power storage configured to be charged with the electric power generated by the electric generator, wherein
the electric generator is disposed to the first operating member, and
the power storage is disposed to the base member at a height below the pivot axis when viewed from a direction parallel to the pivot axis and when the base member is mounted to the handlebar.

2. An operating device for a human powered vehicle, comprising:
a base member including a cylinder bore;
a first operating member configured to be movably coupled to the base member about a pivot axis between a first rest position and a first operated position;
a piston configured to be movably provided in the cylinder bore and to be pulled by a piston rod connected to the first operating member in response to a movement of the first operating member from the first rest position toward the first operated position, the piston is pulled from an initial position to an actuated position when the first operating member is moved from the first rest position to the first operated position, the actuated position is closer to the first operating member than the initial position in a state where viewed from a direction parallel to the pivot axis, the base member includes a first end portion configured to be coupled to a handlebar, and a second end portion opposite to the first end portion, the cylinder bore and the piston is provided to the second end portion;
an electric generator configured to generate electric power in accordance with a physical change applied to the operating device;
a second operating member configured to be movably coupled to one of the base member and the first operating member; and
a power storage configured to be charged with the electric power generated by the electric generator, wherein
the power storage is mounted to the base member at a height below the pivot axis when viewed from a direction parallel to the pivot axis and when the base member is mounted to the handlebar.

3. The operating device according to claim 1, further comprising
an electrical switch; and
a controller configured to generate an operation signal in response to an operation of the electrical switch, wherein
the electric generator is configured to generate the electric power in response to the operation of the electrical switch.

4. The operating device according to claim 3, further comprising
a second operating member configured to be movably coupled to one of the base member and the first operating member, wherein
the electrical switch is provided on at least one of the first operating member and the second operating member.

5. The operating device according to claim 3, further comprising
a communicator configured to wirelessly transmit the operation signal generated by the controller.

6. The operating device according to claim 5, further comprising
a second operating member configured to be movably coupled to one of the base member and the first operating member, wherein
the communicator is configured to be provided on at least one of the base member, the first operating member, and the second operating member.

7. The operating device according to claim 1, wherein
the electric generator includes a piezoelectric element.

8. The operating device according to claim 1, wherein
the base member includes a hydraulic reservoir configured to be connected to the cylinder bore.

9. The operating device according to claim 1, wherein
the base member includes a first end configured to be mounted to a steering device of the human powered vehicle, a second end opposite to the first end, and a grip portion configured to be arranged between the first end and the second end.

10. An operating device for a human powered vehicle, comprising:
a base member including a cylinder bore;
a first operating member configured to be movably coupled to the base member about a pivot axis between a first rest position and a first operated position;
a piston configured to be movably provided in the cylinder bore and to be pulled by a piston rod connected to the first operating member in response to a movement of the first operating member from the first rest position toward the first operated position, the piston is pulled from an initial position to an actuated position when the first operating member is moved from the first rest position to the first operated position, the actuated position is closer to the first operating member than the initial position in a state where viewed from a direction parallel to the pivot axis, the base member includes a first end portion configured to be coupled to a handlebar, and a second end portion opposite to the first end portion, the cylinder bore and the piston are provided to the second end portion; and
a power storage configured to be charged, wherein
the power storage is a rechargeable battery, and
the power storage is mounted to the base member at a height below the pivot axis when viewed from a direction parallel to the pivot axis and when the base member is mounted to the handlebar.

11. An operating device for a human powered vehicle, comprising:
a base member including a cylinder bore;
a first operating member configured to be movably coupled to the base member about a pivot axis between a first rest position and a first operated position;
a piston configured to be movably provided in the cylinder bore and to be pulled by a piston rod connected to the first operating member in response to a movement of the first operating member from the first rest position toward the first operated position, the piston is pulled from an initial position to an actuated position when the first operating member is moved from the first rest position to the first operated position, the actuated position is closer to the first operating member than the initial position in a state where viewed from a direction parallel to the pivot axis, the base member includes a first end portion configured to be coupled to a handlebar, and a second end portion opposite to the first end portion, the cylinder bore and the piston are provided to the second end portion;
a power storage configured to be charged; and
a second operating member configured to be movably coupled to one of the base member and the first operating member, wherein
the power storage is mounted to the base member at a height below the pivot axis when viewed from a direction parallel to the pivot axis and when the base member is mounted to the handlebar.

12. The operating device according to claim 10, further comprising
an electric generator configured to generate electric power in accordance with a physical change applied to the operating device, wherein
the power storage is configured to be charged with the electric power generated by the electric generator.

13. The operating device according to claim 12, further comprising
an electrical switch; and
a controller configured to generate an operation signal in response to an operation of the electrical switch, wherein
the electric generator is configured to generate the electric power in response to the operation of the electrical switch.

14. The operating device according to claim 13, further comprising
a second operating member configured to be movably coupled to one of the base member and the first operating member, wherein
both of the electrical switch and the electric generator are provided on at least one of the base member, the first operating member, and the second operating member.

15. The operating device according to claim 13, further comprising
a communicator configured to wirelessly transmit the operation signal generated by the controller.

16. The operating device according to claim 15, further comprising
a second operating member configured to be movably coupled to one of the base member and the first operating member, wherein
the communicator is configured to be provided on at least one of the base member, the first operating member, and the second operating member.

17. The operating device according to claim 12, wherein
the electric generator includes a piezoelectric element.

18. The operating device according to claim 10, wherein the base member includes a hydraulic reservoir configured to be connected to the cylinder bore.

19. The operating device according to claim 10, wherein the base member includes a first end configured to be mounted to a steering device of the human powered vehicle, a second end opposite to the first end, and a grip portion configured to be arranged between the first end and the second end.

20. The operating device according to claim 1, wherein the operating device is a hand operating device, and the electric generator is configured to generate electric power in accordance with the physical change applied to the hand operating device.

21. An operating device for a human powered vehicle, comprising:
a base member including a cylinder bore;
a first operating member configured to be movably coupled to the base member about a pivot axis between a first rest position and a first operated position;
a piston configured to be movably provided in the cylinder bore and to be pulled by a piston rod connected to the first operating member in response to a movement of the first operating member from the first rest position toward the first operated position, the piston is pulled from an initial position to an actuated position when the first operating member is moved from the first rest position to the first operated position, the actuated position is closer to the first operating member than the initial position in a state where viewed from a direction parallel to the pivot axis, the base member includes a first end portion configured to be coupled to a handlebar, and a second end portion opposite to the first end portion, the cylinder bore and the piston is provided to the second end portion;
an electric generator configured to generate electric power in accordance with a physical change applied to the operating device;
a second operating member configured to be movably coupled to one of the base member and the first operating member; and
a power storage configured to be charged with the electric power generated by the electric generator, wherein
the electric generator is disposed to one of the first operating member and the second operating member, and
the power storage is disposed to the base member at a height below the pivot axis when viewed from a direction parallel to the pivot axis and when the base member is mounted to the handlebar.

22. The operating device according to claim 1, wherein the power storage is a rechargeable battery.

23. The operating device according to claim 3, wherein both of the electrical switch and the electric generator are provided on the first operating member.

24. The operating device according to claim 1, wherein the movement of the first operating member from the first rest position toward the first operated position pulls the piston closer to the pivot axis.

25. The operating device according to claim 1, wherein the pivot axis is disposed at a height below at least a portion of the cylinder bore when the base member is mounted to the handlebar.

26. The operating device according to claim 1, further comprising:
a biasing member that biases the first operating member toward the first rest position relative to the base member.

27. The operating device according to claim 1, further comprising:
a cover attached the base member to cover an internal cavity of the base member; and
a grip cover at least partly covering a base body of the base member, wherein
the power storage is disposed within the internal cavity of the base member,
the cover covers the power storage within the internal cavity, and
the grip cover covers the cover.

28. The operating device according to claim 27, further comprising
an electrical switch; and
a button to operate the electrical switch, wherein
the electric generator is configured to generate the electric power in response to the operation of the electrical switch, and
the button is mounted within the internal cavity and includes a portion that extends through an opening in the cover.

29. An operating device for a human powered vehicle, comprising:
a base member including a cylinder bore; the base member includes:
a first end portion configured to be a handlebar,
a second end portion opposite the first end portion,
a grip portion configured to be arranged between the first end portion and the second end portion,
a first operating member configured to be movably coupled to the base member about a pivot axis between a first rest position and a first operated position;
a piston configured to be movably provided in the cylinder bore and to be pulled by a piston rod connected to the first operating member from an initial position toward an actuated position in response to a movement of the first operating member from the first rest position toward the first operated position, the actuated position is closer to the first operating member than the initial position in a state viewed from a direction parallel to the pivot axis, the the cylinder bore and the piston are provided to the second end portion; and
an electric generator configured to generate electric power in accordance with a physical change applied to the operating device.

30. An operating device for a human powered vehicle, comprising:
a base member including a cylinder bore; the base member includes:
a first end portion configured to be a handlebar,
a second end portion opposite the first end portion,
a grip portion configured to be arranged between the first end portion and the second end portion,
a first operating member configured to be movably coupled to the base member about a pivot axis between a first rest position and a first operated position;
a piston configured to be movably provided in the cylinder bore and to be pulled by a piston rod connected to the first operating member from an initial position toward an actuated position in response to a movement of the first operating member from the first rest position toward the first operated position, the actuated position is closer to the first operating member than the initial position in a state viewed from a direction parallel to the pivot axis, the cylinder bore and the piston are provided to the second end portion; and a power storage configured to be charged.

31. The operating device according to claim 29, further comprising:

a mounting clamp configured to couple to a handlebar, wherein a first end portion.

32. The operating device according to claim 30, further comprising:

a mounting clamp configured to couple to a handlebar, wherein a first end portion.

\* \* \* \* \*